United States Patent [19]

Nguyen et al.

[11] Patent Number: 5,283,783
[45] Date of Patent: Feb. 1, 1994

[54] APPARATUS AND METHOD OF TOKEN RING BEACON STATION REMOVAL FOR A COMMUNICATION NETWORK

[75] Inventors: Truong Q. Nguyen; Isaac P. Choi, both of San Jose, Calif.

[73] Assignee: Synoptics Communications, Inc., Santa Clara, Calif.

[21] Appl. No.: 11,176

[22] Filed: Jan. 28, 1993

[51] Int. Cl.$^5$ .................................. H04L 12/42
[52] U.S. Cl. ...................... 370/16.1; 340/825.16; 370/85.5; 371/11.2
[58] Field of Search .............. 340/825.05, 825.16; 370/16, 16.1, 56, 85.15, 85.5

[56] References Cited

U.S. PATENT DOCUMENTS

| | | | |
|---|---|---|---|
| 4,937,823 | 6/1990 | Bekki et al. | 371/11.2 |
| 5,105,188 | 4/1992 | Jung et al. | 370/16.1 |
| 5,235,599 | 8/1993 | Nishimura et al. | 370/16.1 |

Primary Examiner—Benedict V. Safourek
Attorney, Agent, or Firm—Blakely, Sokoloff, Taylor & Zafman

[57] ABSTRACT

A network process that automatically identifies and isolates a faulty station or group of stations within a token ring communication network in a timely manner. The present invention performs three different and separate processing strategies to identify and isolate faulty stations and or groups of stations within a token ring communication network. The processing of the present invention is accomplished simultaneously within the network management modules of each concentrator within the overall communication network. Upon receipt of beacon signals indicating a faulty station in the network, the present invention directs the NMM to isolate newly inserted stations or modules. If this is not successful then the present invention attempts a direct removal process if port address association data is present. If no port address association data is present then a brute force process is performed to identify and isolate the station or module that is generating a communication fault within the token ring network.

37 Claims, 15 Drawing Sheets

APPARATUS AND METHOD OF TOKEN RING BEACON STATION REMOVAL FOR A COMMUNICATION NETWORK

BACKGROUND OF THE INVENTION (1) Field of the Invention

The present invention relates to the field of communication networks. Specifically, the present invention relates to the field of identifying and correcting for communication faults within the communication paths of an overall network system arraigned in a token ring typology.

(2) Prior Art

Communication networks provide capability for multiple computer systems, peripherals and other information storage, retrieval or processing units (stations) to share data between themselves over the communication network. There are various network topologies that a communication network can adopt which are old in the art of communication networks; these topologies include star topology, tree topology (or generalized bus topology) and token ring topology. In a token ring topology, units or nodes of the communication network are communicatively interconnected in a close-end ring fashion with each node occupying a particular position within the overall ring structure. Several nodes on a particular ring may physically reside on a network concentrator which provides, among other control functions, a coupling platform for the associated nodes (stations). Each network concentrator of a Token Ring network also contains a network management module or NMM which performs several control and timing functions between the associated nodes of the token ring network and intercommunication between the nodes.

Within the token ring communication network, in order for one node to communicate with another node in the network it must have priority to a unique token dataframe or code which traverses the ring. This token travels around the nodes of the ring until one particular node requests communication. The node requesting communication will take the token from the ring and transmit a signal that the token is busy. At that point none of the other nodes may communicate over the ring because the token has been replaced with a busy token or marked busy. The node with the token, the source node, may then transmit a message package to another particular node, the destination node. The message package (dataframe) will indicate the destination node by a particular label attached to the message or dataframe. The message is passed along the nodes of the ring structure in a particular direction, node by node, until the destination node receives the message. After the destination node receives the message, it copies the message into its internal buffer and also continues to send the message along the ring until the source node receives the message back. Once the source node receives its own message it then releases the token back onto the ring and discontinues the message. A network management module attached to the ring may also remove messages that have traversed the ring more than once, i.e., if the source module faulted after sending the message.

In a token ring structure each node is called a repeater because each node repeats a message through the ring whether or not the particular message is destined for that node. Therefore, the communications scheme of a ring topology communication network requires that each and every node of the ring be operating properly to repeat messages around the ring. A disastrous effect will occur within a token ring if one particular node or station malfunctions and will not repeat messages. A faulting station will break the communication line that point. This occurrence will bring the entire token ring network down since messages will not flow past the malfunctioning node. In this state, problem stations can also prevent new stations from being inserted into the network and can disconnect or interrupt higher logical session layers (i.e., SNA).

Several reasons may cause a node along the token ring to malfunction. First, a node having an incorrect communication frequency may be inserted into the token ring network. The incompatible frequency will lock out the newly added node from the network. Or, a cable may break in between stations of the ring network thus breaking the ring at one or more places. If adjacent stations become physically isolated then the network will fail. Also a station may malfunction and not remove itself from the ring causing a break in the communication network. In any of a number of different scenarios, it would be advantageous to be able to detect a malfunctioning node and remove or isolate that node from the remainder of the network to prevent communication failure. The present invention offers such a solution.

A way to identify and isolate malfunctioning stations within the token ring system is to pull out the cables associated with each station until the malfunctioning station is removed. However this solution is not practical in large complicated network systems. Moreover, what is needed is a system that can automatically isolate the problem station without requiring user interaction. The present invention offers such capability. Also, the IEEE 802.5 communication standard provides a system for beacon removal within a communication network to prevent network shutdown. However, if the malfunctioning or problem station does not conform the 802.5 standard then the malfunctioning station will not be removed from the ring network. What is needed is a system for identifying and isolating problem stations that do not conform to a particular standardized communication protocol. The present invention provides such a system.

Therefore, it is an object of the present invention to advantageously improve communication reliability and integrity within a token ring communication network. It is further an object of the present invention to identify a malfunctioning station within the communication ring and communicatively isolate (bypass) that malfunctioning station from the remainder of the token ring communication network to prevent network shutdown. It is also an object of the present invention to accomplish the above objects within the framework of existing token ring communication networks without the need for substantial additional hardware. It is an object of the present invention to provide the above features in an automatic system and among nodes that may or may not conform to a particular predetermined communication protocol. These and other objects of the present invention not specifically mentioned above will be evident from the detailed descriptions of the present invention herein presented.

The above mentioned IEEE 802.5 communication standard provides a general overview and background of the well-known token ring communication typology.

For this reason, the IEEE 802.5 standard protocol is incorporated herein by reference.

SUMMARY OF THE INVENTION

An embodiment of the present invention advantageously operates within a token ring communication network having a plurality of communicating stations generating communication traffic, each of the plurality of communicating stations generating beacon dataframes within the communication traffic in response to communication faults between the plurality of communicating stations, an apparatus for identifying and communicatively isolating faulty stations, an embodiment of the present invention comprising: first isolating means for isolating newly inserted stations of the plurality of communicating stations in response to the beacon dataframes to remove the beacon dataframes from the communication traffic; second isolating means for directly isolating particular stations of the plurality of communicating stations identified by a port address association database referenced by the beacon dataframes to remove the beacon dataframes from the communication traffic, the second isolating means operable if the first isolating means fails to isolate all faulty stations; and third isolating means for procedurally isolating each station of the plurality of communicating stations to remove the beacon dataframes from the communication traffic, the third isolating means operable if the first isolating means and the second isolating means fail to isolate the all faulty stations.

The present invention includes an embodiment as described above and further comprising means for integrating particular stations that are not faulty but that were previously isolated by the second isolating means and/or the third isolating means, the means for integrating particular stations also for indicating faulty stations by leaving isolated any faulty stations which were isolated by the second isolating means and/or the third isolating means.

The present invention includes an embodiment as described above and wherein the second isolating means comprises means for isolating the RI/RO module of the concentrator means if the upstream neighbor address references an upstream neighbor station which is associated with the RI/RO module and means for isolating the upstream neighbor station identified by the upstream neighbor address if the upstream neighbor station is not associated with the RI/RO module and wherein the third isolating means comprises means for isolating all of the plurality of modules of the token ring communication network; means for integrating each isolated module if integration of the each module does not cause generation of beacon dataframes within the communication traffic, the means for integrating also for marking modules which are not integrated to form marked modules; and means for integrating each station associated with each of the marked modules if integration of the each station associated with each of the marked modules does not cause generation of beacon dataframes within the communication traffic and wherein the first isolating means comprises: means for isolating newly inserted modules of the plurality of modules, the newly inserted modules coupled to the concentrators; and means for isolating newly inserted communicating stations, the newly inserted communicating stations associated with particular modules of the plurality of modules.

DETAILED DESCRIPTION OF THE INVENTION

The present invention includes an apparatus and method for identifying and isolating in a timely manner a problem station from a token ring communication network to prevent communication faults or network shut down. In the following detailed description of the present invention numerous specific details are set forth in order to provide a thorough understanding of the present invention. However, it will be obvious to one skilled in the art that the present invention may be practiced without these specific details. In other instances well known methods have not been described in detail as not to unnecessarily obscure the present invention.

The preferred embodiment of the present invention operates within a LattisNet System 3000/3030 ™ concentrator system available from SynOptics, San Jose, Calif. This particular concentration system has been disclosed in order to provide an environment in which to fully explain the details of the present invention. However, it is appreciated that the advantageous aspects of the present invention may be readily be applied to any network system providing a token ring communication topology. The present invention is not limited to the environment of the above named concentrator system.

Figure 1:
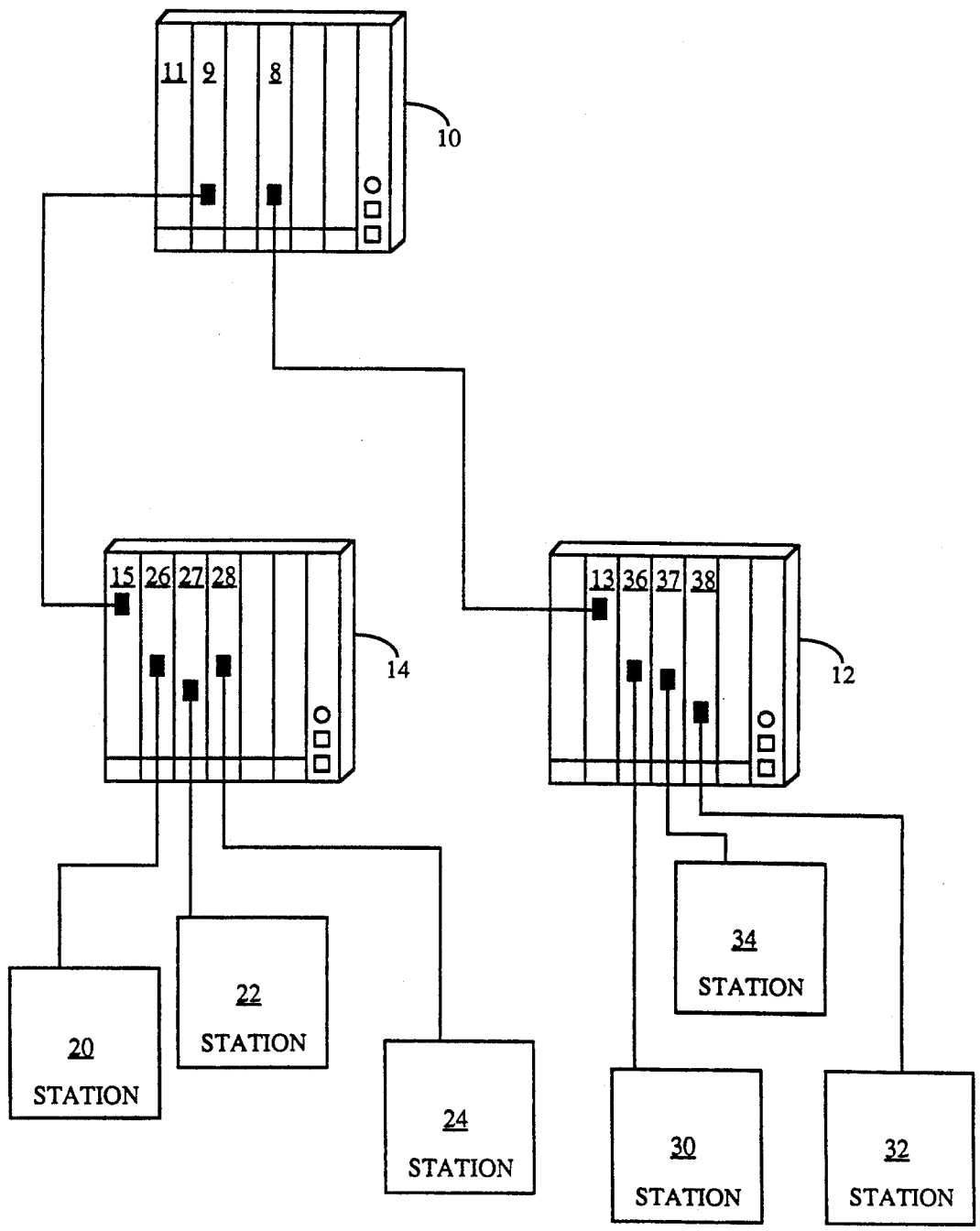
FIG. 1 is a physical diagram of a typical communication network including concentrator and station linkage employed within the present invention.

Refer to FIG. 1 showing a physical linkage diagram of a communication network of the present invention. Three concentrator units 10, 14, 12 are shown coupled together by conventional communication cables. The concentrators of the present invention are intelligent concentrators in that they provide much more than a mere coupling location but also provide communication control and error handling within the communication system via a network management module. Each concentrator has several modules which are shown as vertical blocks within each concentrator each module has an associated slot in the concentrator. Modules are coupled together within a concentrator via a backplane bus (not shown) which is common to all slots of the concentrator for coupling the modules. Each module bears several ports and each port may couple to a different station. In FIG. 1 a single station is shown coupled to a module however several stations may couple to the same module. Each concentrator also has a network management module or NMM which is capable of performing the fault station identity and isolation functions of the present invention. The associated NMM of each contractor controls the flow of communication between the associated stations within a single concentrator and communications between associated concentrators. Concentrator 10 has NMM 11, concentrator 14 has NMM 15 and concentrator 12 has NMM 13. As stated, the NMM is responsible for network communication control and signaling within each concentrator and also for controlling and providing communication capability between individual concentrators. Concentrator 14 is coupled via NMM 15 to module 9 of concentrator 10; module 9 is an RI/RO module. Further concentrator 12 is coupled via NMM 13 with module 8 of concentrator 10; module 8 is an RI/RO module. In this way, all three concentrators are communicatively connected together and allow their associated stations to form a single token ring topology. As shown, concentrator 10 has no associated stations directly coupled to it. Therefore, it can be appreciated that a single concentrator does not necessarily make up the entire ring of a token ring topology but several concentrators may to coupled together to form a single token ring topology.

Refer to FIG. 1. Three stations are coupled to concentrator 14. These stations are data terminal equipment (DTE) devices or may be individual computer systems, like a standard PC system. Station 20 is coupled to module 26, station 22 is coupled to module 27, and station 24 is coupled to module 28 of concentrator 14. Three stations are also coupled to concentrator 12. Station 30 is coupled to module 36, station 32 is coupled to module 38, and station 34 is coupled to module 37 of concentrator 12. By interconnecting concentrators 12 and 14 to the main concentrator 20, all of the six stations of this network are communicatively coupled together in a ring topology.

Figure 2:
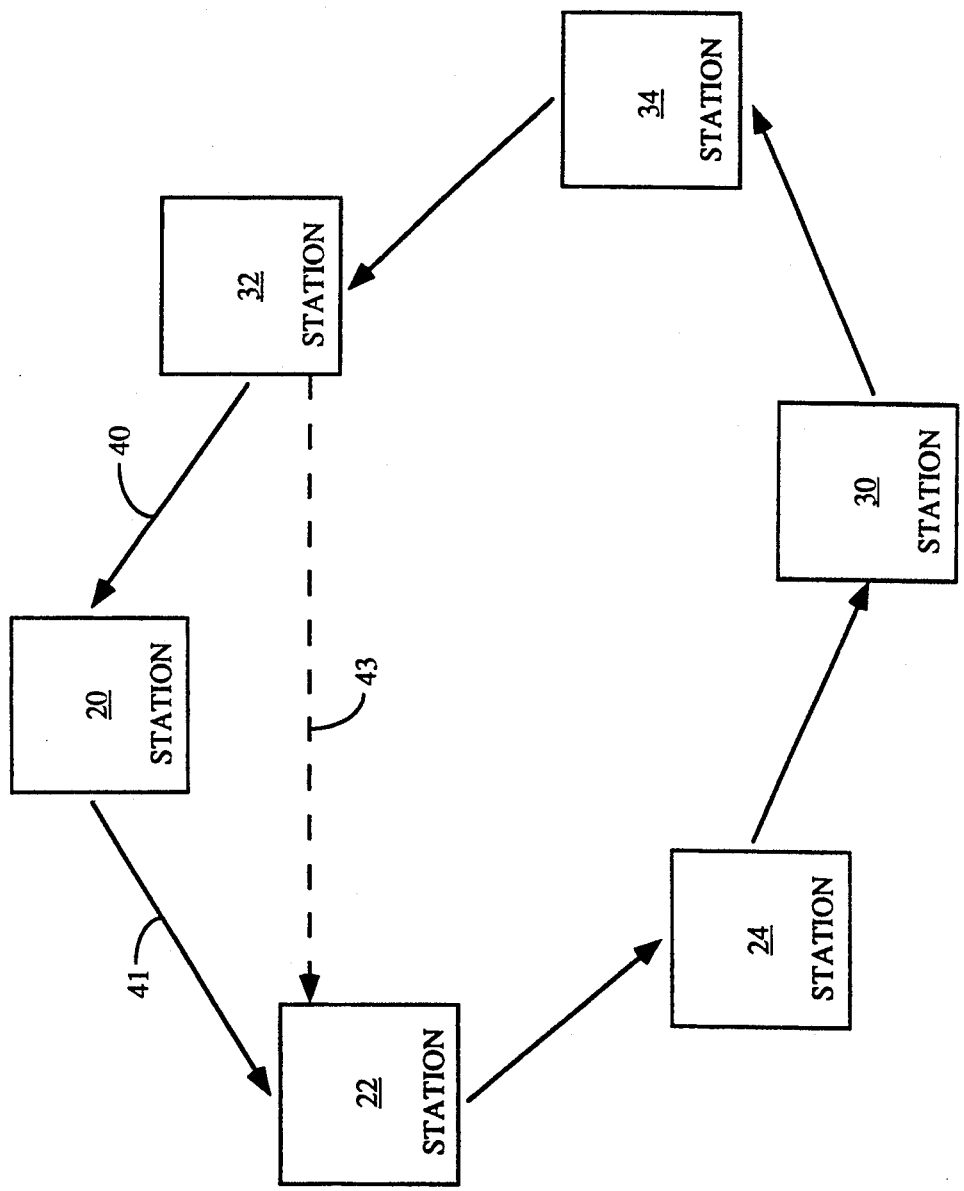
FIG. 2 is a communication diagram representing the token ring network topology generated based on the communication linkage of FIG. 1.

Refer now to FIG. 2 which illustrates the functional topology of the network system of FIG. 1. The topology of the present invention is a token ring topology and therefore the six stations of the network are arranged in a ring structure as shown. Communications within the token ring network will travel in the same direction as indicated by the arrows between each station. Messages that traverse this token ring system manly include the token, data frames, and network control packets. These messages are often referred to as communication traffic. A particular node within the token system will be designated as an active monitor which will control several communication features of the token ring network, including maintaining and updating the token as well as eliminating messages from the ring that have traversed the network more than once. A detailed description of a token ring network system may be obtained from the IEEE 802.5 communication standard. Since such a detailed description is not required to illustrate the advantageous elements of the present invention it has not been completely reproduced herein. Furthermore, certain levels of detail concerning the IEEE 802.5 communication standard are not reproduced herein as to not unnecessarily obscure the elements of the present invention.

FIG. 2 illustrates a token ring topology of the six stations of the network. The NMMs 11, 15, 13 of the concentrators act to perform the control layers required to allow the token ring communication network to operate. In this sense, these layers are transparent to the token ring topology so they are not required within the diagram of FIG. 2. By way of terminology, a station that is adjacent to another station is called its neighbor station. Therefore, station 20 is a neighbor station to station 22 and to station 32. Since communication travels in fixed direction around the token ring, stations that receive data from a neighbor station are called down stream from that station. Therefore, station 20 is down stream from station 32. Stations that send data to another neighbor station are called upstream to that station. Therefore, station 32 is upstream from station 20 and so on. Station 32 is the upstream neighbor station to station 20 and has an upstream neighbor address to station 20.

A goal of the present invention is to identify and isolate problem stations causing communication faults from this token ring topology. Therefore, assuming station 20 was problematic within the network system, the preferred embodiment would identify station 20 as the problematic station and then communicatively isolate station 20 from the network. As an intermediate step the present invention may have to identify the fault module associated with station 20 in order to then wrap (isolate) the station. Isolation is performed within the concentrators via bypassing the problematic station. For instance, communication paths 40 and 41 would be temporarily interrupted and a new path shown by dashed line 43 would be installed between stations 32 and 22 when station 20 is isolated (wrapped). Stations 32 and 22 would then become neighbor stations with station 32 upstream from station 22. Station 20 would be isolated from the communication network. In this way the problems of station 20 will not cause the entire token ring network to shut down. And station 20 would be identified for later troubleshooting. At some later point station 20 may be re-inserted back into the token ring network of FIG. 2. The control required to perform the above tasks is accomplished by the network management module. In this example there are three NMMs 15, 13 and 11. Between these three, one NMM will have priority depending on which NMM has the highest priority identifier or address. That NMM will perform the control required to remove a particular station from the network at a particular concentrator. A concentrator having multiple NMMs must designate one NMM with highest priority to perform the functions of the present invention.

Referring still to FIG. 2, assuming station 20 is faulty then no communication will traverse through path 41 to station 22. The present invention will realize that no token dataframes are traversing path 41 to station 22 since node 22 is not receiving tokens over a timeout period. At this point, after a predetermined time-out period during which no token rings are received, station 22 will begin to issue beacon dataframes and is called a beaconing station; station 22 is "beaconing" to indicate some fault over the network because station 22 has not received any token dataframes in excess of a predetermined period. The other stations in the network will repeat this beacon dataframe from station 22 as well as generate separate beacon dataframes of their own. Each station that receives a beacon dataframe from another upstream station will automatically stop generating beacon dataframes of its own and merely repeat the beacon dataframe of the upstream station. Therefore, stations 24, 30, 34, and 32 will receive at least one upstream beacon dataframe since station 22 is beaconing so each will stop generating beacon dataframes of their own. In so doing, after a short period only the station adjacent to the faulty station (station 22) will remain beaconing, while the other stations will merely repeat the beacon dataframes from station 22. By way of terminology, the station beaconing is called the beaconing station and the address of the station upstream from the beaconing station is called the upstream neighbor address or UNA. In response to the beacon dataframes, the present invention begins a special procedure executed by and within the electronics of the NMM unit of the concentrator to identify the faulty station(s) and isolate that station from the token ring network. This procedure is referred to as beacon removal. If, by chance, there are multiple NMMs within a particular concentrator then the NMM with the highest priority will be selected to perform the beacon station removal process of the present invention within a particular concentrator of the token ring communication network.

It is appreciated that within a beacon dataframe is the location data (identification) of the beaconing station.

Figure 3:
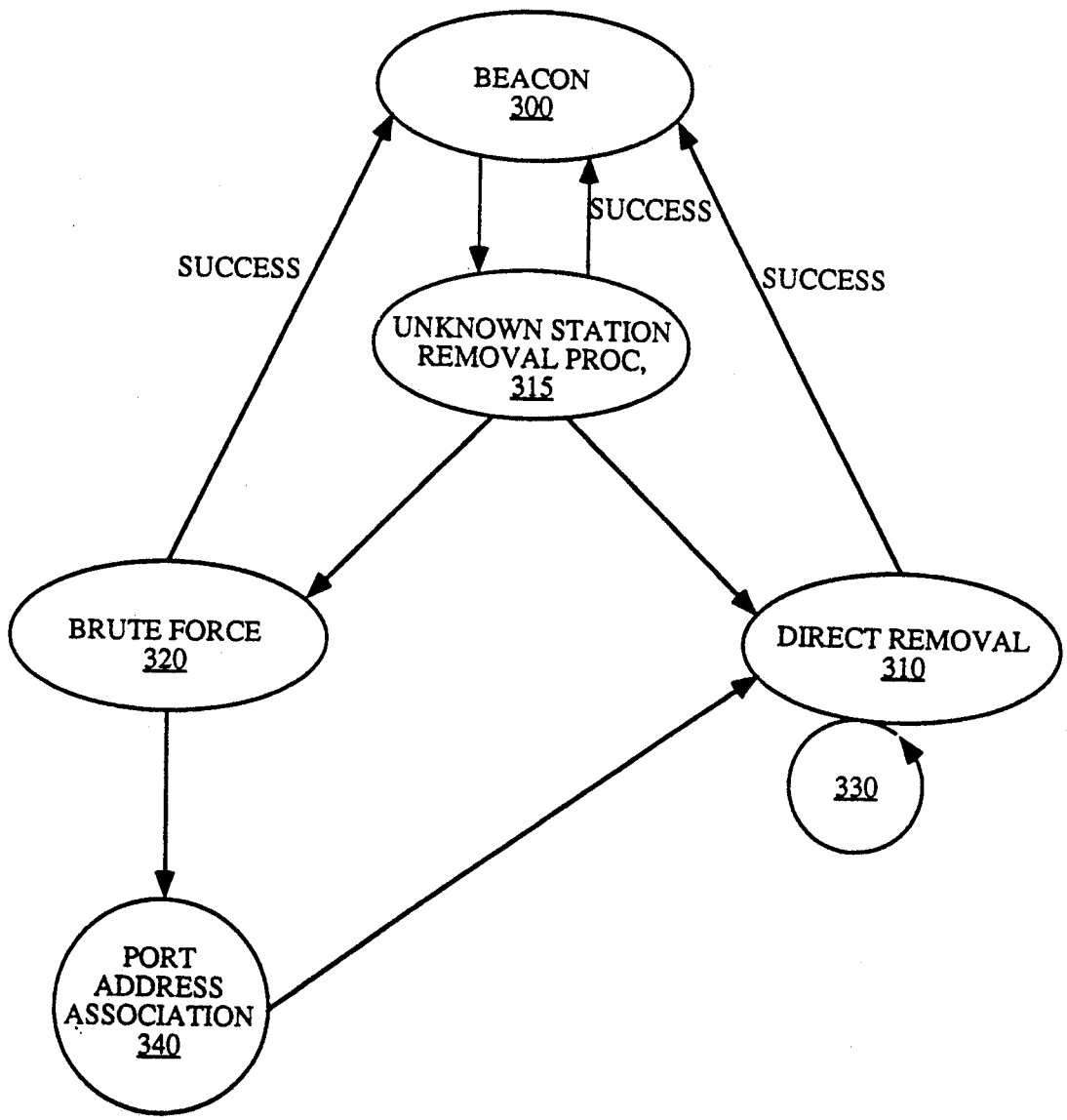
FIG. 3 is an overall flow diagram of the major processing tasks of the present invention and the background processing of the port address association process of the present invention.

FIG. 3 illustrates the overall flow of the procedure utilized by the preferred embodiment of the present invention for beaconing techniques for faulty station removal. The preferred embodiment of the present invention undergoes three separate processing blocks each having a different strategy in order to identify and isolate the faulty station(s). FIG. 3 illustrates these three processing blocks 315, 320 and 310. In an effort to isolate the faulty station, all three blocks may be executed by the present invention in a predetermined order based on certain conditions which will be expanded below. Processing block 340 is the port address association block and operates continuously in the background to construct and maintain the port address database used by the direct removal block 310. In an overall explanation, processing block 300 represents the beacon process wherein a station will generate and/or repeat a beacon dataframe in response to the expiration of a predetermined time period without receiving a token dataframe. This would indicate a break in the communication line of the token ring. Processing block 300 is a fault detection routine where the communication traffic of the token ring is polled by the NMM in order to detect the presence of beacon dataframes. Once a beacon dataframe is indicated to the NMM, it begins the processing of 315. The present invention directs the NMM to begin unknown station removal at block 315. During unknown station removal, the most recently inserted station or group of stations that were placed into the communication network are first isolated one at a time to indicate which station or one of a group of stations is faulty, if any. Then the beaconing routine 300 is checked to see if beaconing within the network has stopped. If beaconing has stopped then the present invention was successful and the identification and isolation routine is over and the processing returns to block 300 to again watch for and indicate any new faults. Block 315 also reports that stations were faulty and identifies them. Faulty stations may be integrated back into the ring topology if they are corrected at a later point.

If the beaconing continues in response to the processing of block 315 then the beacon station has not received normal communication and a faulty station is still present; therefore the present invention must undergo further processing to identify and isolate the faulty station. Either block 320 or block 330 will be executed, depending on the status of the port address association available within the network. Port address association is a database which contains information regarding the topology of the token ring and is generated and maintained by the port address association block 340 which continually operates in the background processing. Within the port address association database there is an index for each beaconing station (and its address) and also the identity (address) of the upstream neighbor (UNA) of that beaconing station. This port address association data is constructed after a period of time when the network is powered up by a series of communications between the nodes of the token ring. Having the port address association database, the present invention can obtain the UNA value of a beaconing station given the beaconing dataframe. Therefore, if a station is faulty before this data buffer has an opportunity to form, the port address association data will not be available. This information is important because it is very likely that the upstream neighbor station associated with an UNA of a beaconing station is a faulty station.

If the port address association database is available, the present invention will direct processing of the priority NMM to block 310 for direct removal processing of faulty stations. Once successful, the processing will return to block 300. As shown by recursive block 330, the processing of block 310 is done for each faulty station within the network. That is, once one faulty station is removed, that may then uncover the presence of another previously undetected faulty station. The recursion allows multiple faulty stations to be detected and directly removed. If the port address association data is not available, the present invention executes the brute force processing of block 320 where each module and station on the network is tested for fault condition. If the processing of block 320 is not successful in isolating the fault, then block 320 will execute at least 10 times in sequence via flow 335. This repeat value is programmable. If the fault is not detected within the 10 repeat cycles, then the present NMM executing this code will wrap itself out of the system. If block 320 is successful in eliminating the beacon dataframes it will return to block 300. This is the overall flow of the preferred embodiment of the present invention. Each of the four processing blocks of the present invention 315, 310, 320, and 340 will be further expanded and explained in the discussions to follow.

It is appreciated that throughout the flow of FIG. 3, the processing of block 340 is performed continuously to construct the port address association database used by block 310.

It is further appreciated that by virtue of the coupling architecture of the 3000/3030 concentrator, the NMM has the ability to bypass a particular module and port within a module from the overall communication network to communicatively isolate a particular module or port within a module from the token ring network. When an NMM isolates a particular node or module this is called wrapping and the isolated module or node is a wrapped. This terminology is used throughout this discussion to indicate when the highest priority NMM isolates a station or group of stations. Therefore, once a particular faulty station has been identified by the NMM, it can be communicatively isolated (bypassed) by the NMM within the concentrator architecture. As a result of wrapping a station, a new communication path is formed within the concentrator between the stations adjacent to the faulty station (both upstream and downstream) to perform the station bypass. Since the NMM acts as a communications hub for the communication traffic of the ring network, it may readily bypass a particular node from the ring network.

As discussed above, a token ring network topology may be constructed utilizing several intelligent concentrators, each concentrator having a multiple number of modules attached to concentrator backplane and each module capable of receiving several stations, each station associated with a single port on the module. Each concentrator has an associated NMM. It is appreciated that the following flow diagrams of the present invention illustrate the processing that occurs on each NMM of each concentrator independently of the other concentrators. Therefore, the following processing should be understood as accomplished within a particular NMM of a particular concentrator and that all other NMMs of other concentrators are executing their processing, separately, autonomously and simultaneously in an effort to identify and isolate faulty stations. The NMM processing within a particular concentrator of interest is called the present NMM and the associated concentrator is called the present concentrator. Concentrators separate from the present concentrator are just called other concentrators.

Figure 4:
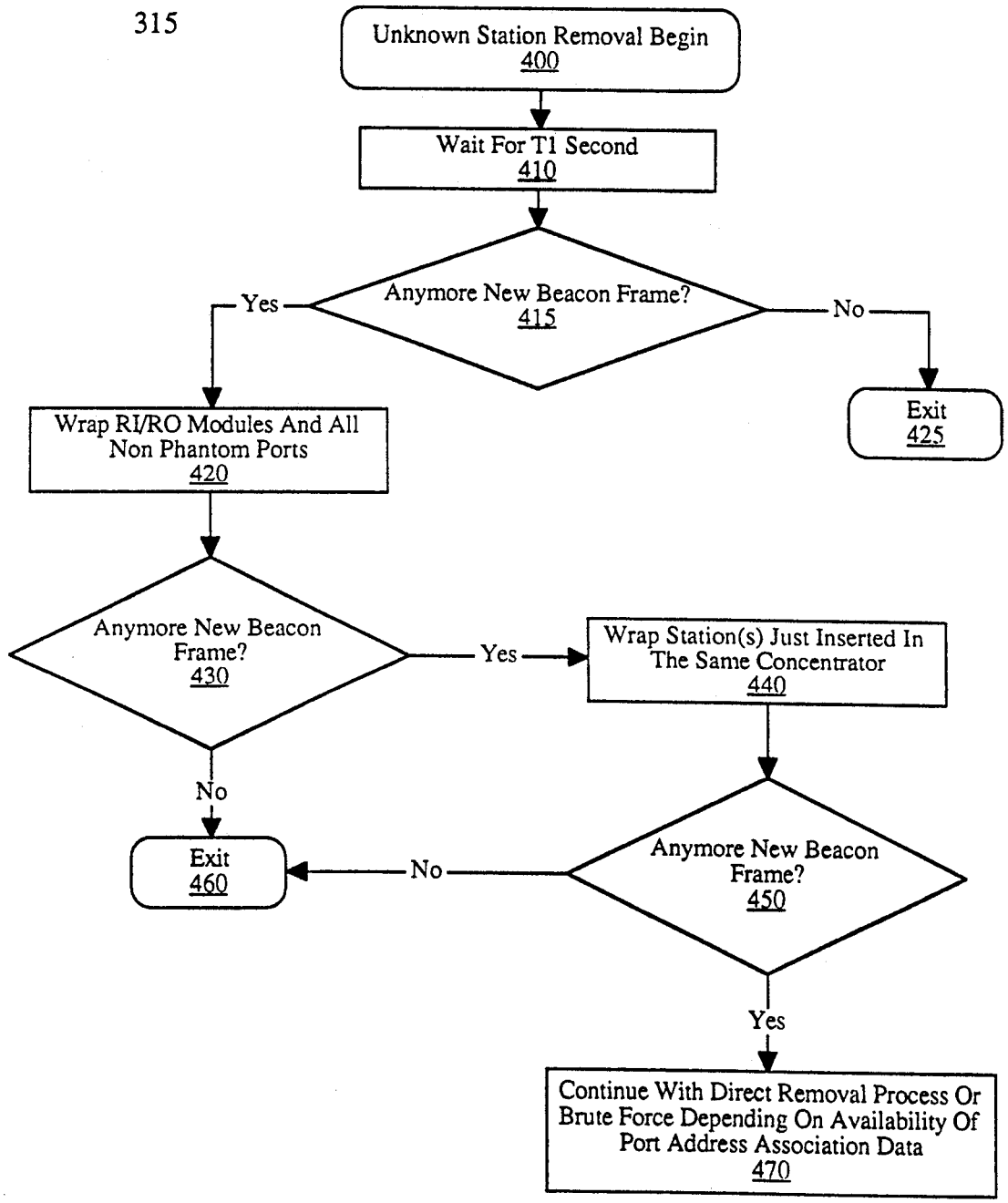
FIG. 4 is a processing task flow diagram of an unknown station removal element of the present invention.

Unknown Station Removal Processing Block 315:

FIG. 4 illustrates the processing blocks of the present invention that perform the unknown station removal function which is the first isolation processing strategy employed by the present invention. Responding to a beacon frame detected in block 300, the primary NMM will scan its entire concentrator and starts isolating station(s) which were recently inserted into the T/R network. This approach is used to isolate multiple faulty stations at the same time. These processing flow blocks are contained within processing block 315 of the overall flow diagram. The NMM unknown station removal processing of the present invention begins at block 400. At block 410 the processing waits for one second after receiving a beacon dataframe in order to respond to transient beacon dataframes that were issued in error. The present invention then directs the NMM electronics to block 415 where the communication traffic of the token ring (T/R traffic) is polled to determine if any more beacon dataframes (data frames) are present (i.e., not issued in error). If there are no beacon dataframes then the processing exits block 315 at block 425 to return to block 300, in this case block 300 detected an invalid beacon dataframe. If a valid beacon dataframe is detected at block 415 the processing flows to block 420 where the RI/RO modules of the present concentrator are wrapped along with all non phantom ports within the token ring network associated with the present concentrator. The RI/RO modules are wrapped to isolate the present concentrator from the remainder of the ring network. Once the above modules are bypassed, at block 430 the T/R traffic is once again sampled and if no beacons are present the flow exits at block 460 to return to block 300. This indicates that either the stations associated with the RI/RO modules or the non phantom ports or both were faulty and have been isolated from the present concentrator.

Referring still to FIG. 4, the present invention continues at block 430; if no new beacon dataframes are generated then processing goes to block 460 to exit and return to block 300, however, if new beacon dataframes are being produced on the T/R communication traffic then processing goes to block 440. Within the same concentrator, the NMM will wrap the most recently placed station or group of stations within an ordered group, as in those stations associated with a particular module during block 440. This is done because there is a high statistical likelihood that a recently added station or module into the network is causing the communication fault indicated by the present beacon dataframe. Therefore, checking these stations first is beneficial. Next, the present invention flows to block 450 where the T/R communication traffic is once again sampled to see if there is any beacon dataframes. If not, then the current communication fault must have been within one of the newly inserted stations that were wrapped at block 440. The processing of the present invention then proceeds to block 460 to exit the processing of the unknown station removal block 315 to return to block 300. If there is still beaconing activity within the T/R traffic detected by block 450 then the fault still exists in someplace within the token ring topology and must be found. At this stage, the unknown station removal processing of block 315 has failed to remove the faulty station and another processing strategy must be employed by the preferred embodiment of the present invention to identify and isolate the faulty node. At block 470 either the direct removal processing (block 310) or the brute force processing (block 320) is employed depending on the availability of port address association data. Therefore, at the end of the processing of the unknown station removal (block 315) of the preferred embodiment of the present invention the system will be within either of two states; either 1) the faulty station will be identified and wrapped at block 420 or block 440; or 2) the system will attempt to execute one of two other fault detection and isolation strategies at block 470 depending on the existence of the port address association database.

Figure 5:
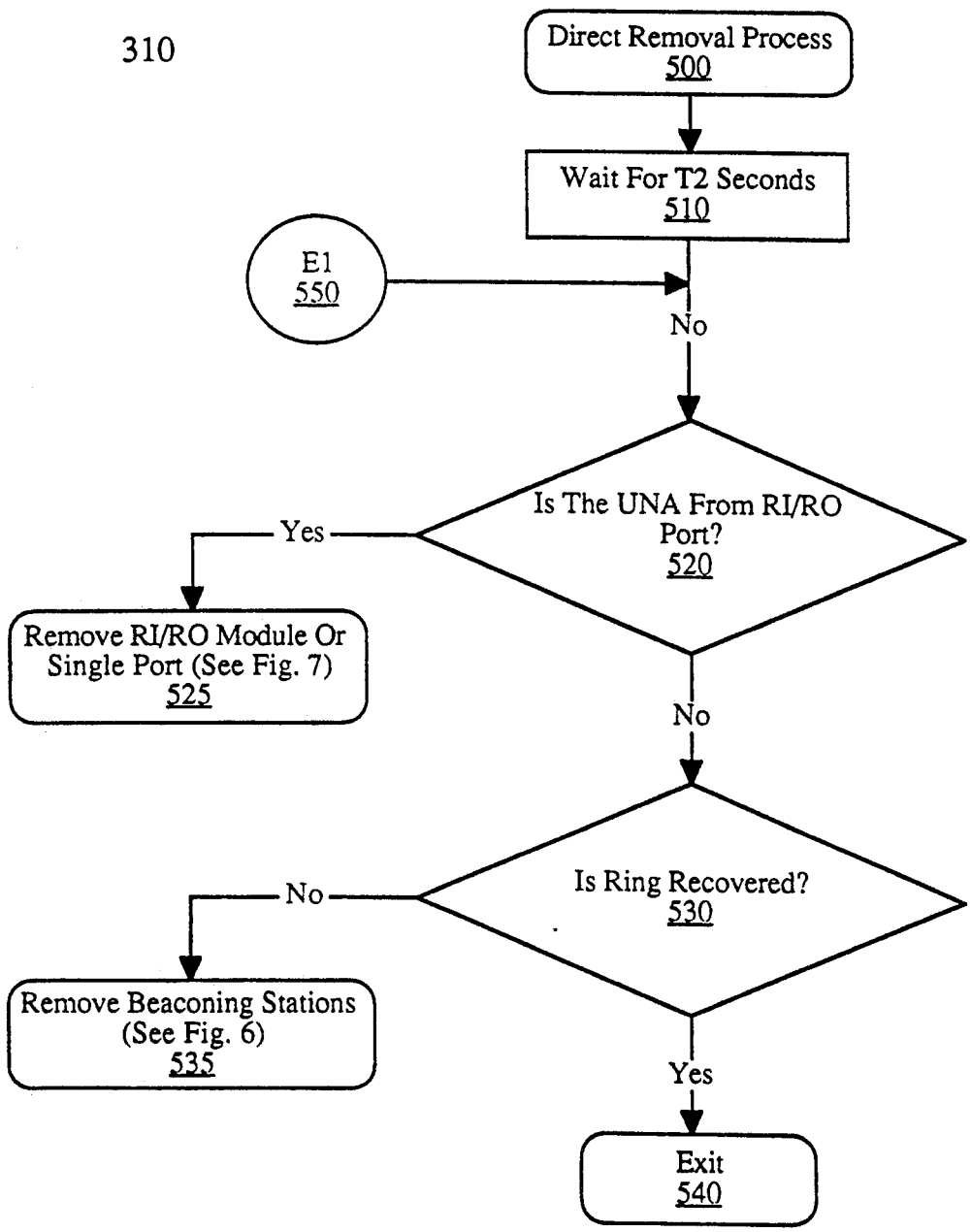
FIG. 5 is a processing task flow diagram of a direct station removal process element of the present invention which is employed when port address association data is available.

Direct Station Removal Processing Block 310:

FIG. 5 illustrates the overall flow processing diagram of the second strategy employed by the present invention which is the direct removal of stations and RI/RO modules from the current concentrator. The processing of FIG. 5 is contained within block 310. This series of processing is executed by the present invention if the unknown station removal processing of block 315 is not successful in identifying and removing the faulty station from the token ring network and port address association data is present. The direct removal processing may on operate if the token ring network was operating long enough to generate port address association data. The process to generate such port address association data will be described further below, however it is sufficient at this point to indicate that if no such data has been previously generated by the T/R network, then processing under block 310 may not occur. A main objective during direct station removal is to isolate the upstream neighbor of a beaconing station referenced by the UNA value. There is a high likelihood that this station is faulty. Assuming port address association data is present, processing begins at block 500. At block 510 the present invention waits for two seconds in order to clear beacon dataframes that may have been issued in error and to wait for the stations to stop beaconing until only the adjacent station to a fault station remains the beaconing station. Also, the system delays for this period in order to respond to network timing contentions between coupled communication rings that may interrupt the normal flow of the tokens around the communication ring. At block 520, the present invention retrieves the current beacon dataframe from the T/R communication traffic and gets the beaconing station address value from the dataframe. Using the beaconing station address as an index into the port association database, the present invention obtains the upstream neighbor address (UNA) value associated with the current beaconing station.

Further at block 520, the present invention directs the NMM to determine of the upstream neighbor address (UNA) is within the domain of the current concentrator, or if the UNA is from the domain of another concentrator, i.e. from the RI/RO port. The RI/RO module is the Ring In/Ring Out module of the concentrator. Concentrators are coupled together via their RI/RO modules to form the token ring. A port address that is not associated with the current concentrator must be associated with the concentrator's RI/RO module. If the UNA is associated with the RI/RO module then processing continues to block 525 where the RI/RO module may be removed (i.e. wrapped) from the present concentrator. Block 525 will be expanded and described on more below. If the UNA is not from within the RI/RO module then the faulty station or module must be coupled within the domain of the present concentrator. Therefore, block 530 is entered and the present invention checks to see if the T/R network is recovered. The T/R network is recovered when no more beacon dataframes (present or additional) exist within the T/R traffic. If the ring recovered already then processing exits to block 540 and returns to main processing block 300. If the ring has not yet recovered (which is the typical state at this stage) processing proceeds to block 535 where particular stations of the present concentrator are removed (wrapped) to identify and isolate the faulty port or module. This process is explained further in discussions below. At the end of processing of block 310 the faulty port or module should be directly removed from the communication station and processing will return to block 300 after the unwrap processing is executed. If the faulty port is not removed by block 310 then the brute force processing must be entered; the brute force strategy will be executed by overall block 300 if block 310 returns without success in recovering the network.

Figure 6:
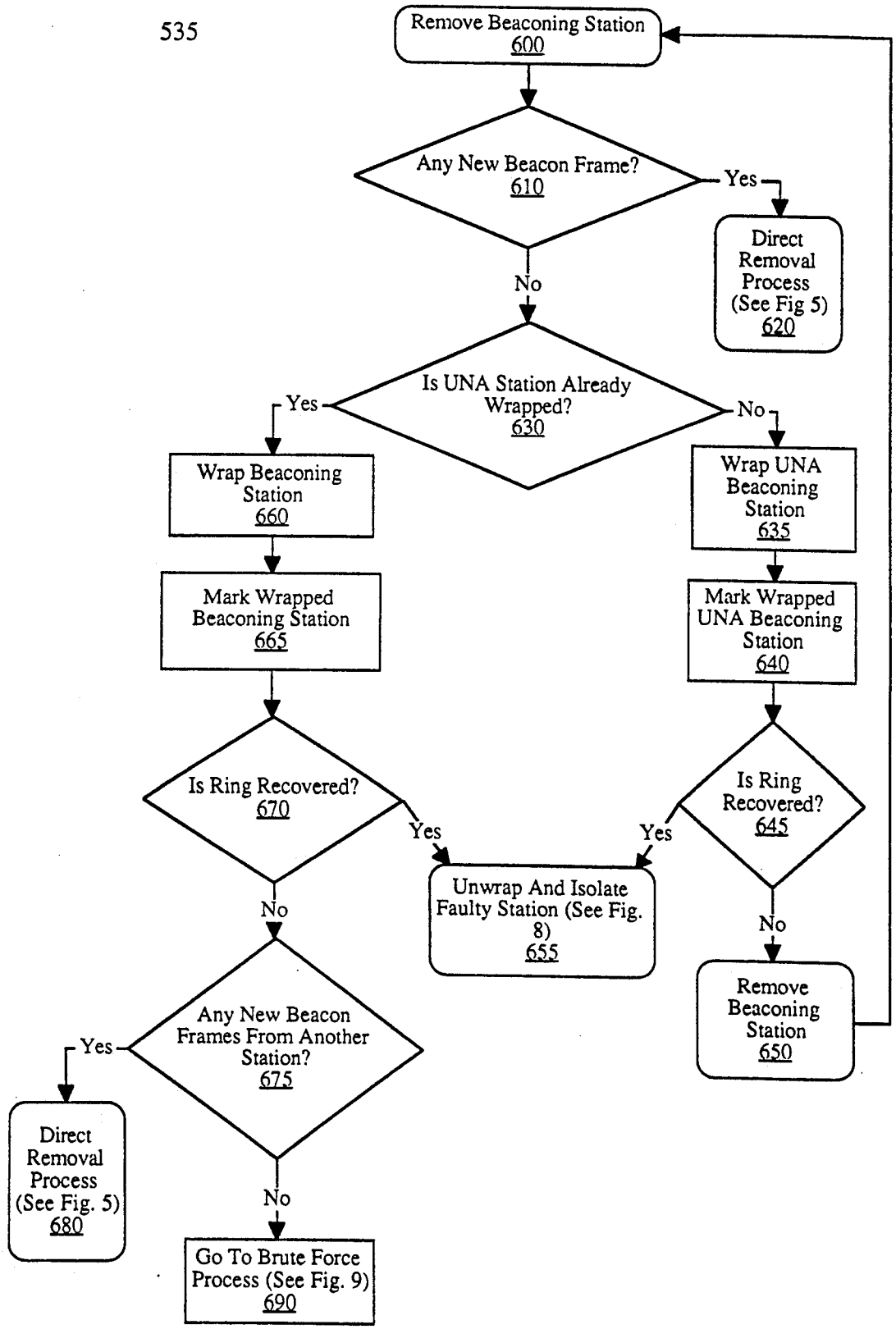
FIG. 6 is a processing task flow diagram of an element of the present invention that removes beaconing stations and upstream neighbor stations from the network.

Referring now to FIG. 6, further processing of the direct removal process strategy is illustrated of the NMM in the preferred embodiment of the present invention required to remove individual ports including the beaconing stations. FIG. 6 illustrates processing associated with block 535. Block 600 starts and continues to block 610 where the present invention checks the T/R traffic to determine if any new beacon dataframes are being delivered in addition to the present beacon dataframe. If a new beacon dataframe is found, in addition to the present dataframe, then block 620 executes the direct removal process (block 310) for each new dataframe in a recursive method to handle each new dataframe individually. If no additional ("new") beacon dataframes are found, the processing continues to block 630 where the UNA value associated with the present beacon dataframe is used and the station associated with the UNA is checked to see if it is bypassed or wrapped already. If the UNA station is not wrapped already, the present invention directs the NMM to block 635 where the UNA value the station associated with the UNA is wrapped and then at block 640 it is marked as being wrapped for later processing and possible unwrapping. Next, at block 645 the present invention checks to see if this wrap was enough to recover the T/R network. If the T/R network is recovered (i.e., no beacon dataframes are present) then the unwrap and isolate faulty stations process begins at block 655 (this process is explained in detail to follow). If the ring is not recovered then processing loops back to block 600 to once again begin the processing of FIG. 6. At this stage, the UNA station removal was not sufficient to clear up the communication fault and therefore the beaconing station may have to be removed.

Returning to block 630, if the UNA station was already wrapped then the processing of the present invention continues to block 660 where the beaconing station is wrapped and then marked at block 665 for later processing. Then processing continues to block 670 where the T/R traffic is once again checked to see if the ring has recovered (i.e., no more beacon dataframes present). If the T/R network recovered after the beaconing station was rapped then processing continues to block 655 where the unwrap and isolate faulty station processing is started. If the ring did not recover then processing proceeds to block 675 where the present invention checks if any new beacon dataframes are present over the token ring network from other stations. With reference to block 655, it is appreciated that several faulty stations may exist within a T/R network simultaneously. Removal of one faulty station (i.e., at block 660) may then allow beacon dataframes which were previously blocked to now be acknowledged by the NMM over the T.R network. Therefore, it is appreciated that block 675 performs the vital function of checking if additional (previously blocked) faults exist within the T/R network once the present faulty station is removed. If additional faults (indicated by new beacon dataframes) are present within the T/R network then the direct removal processes (block 310) is once again executed in a recursive manner at block 680 to isolate them. If additional faults are not detected at block 675, but the ring network is not recovered yet, then the direct removal process has failed to restore the token ring communication networl. Therefore, another strategy must be employed at this point. Processing proceeds to block 690 where the brute force process is employed as an additional processing strategy to eliminate the faulty station(s).

Figure 7:
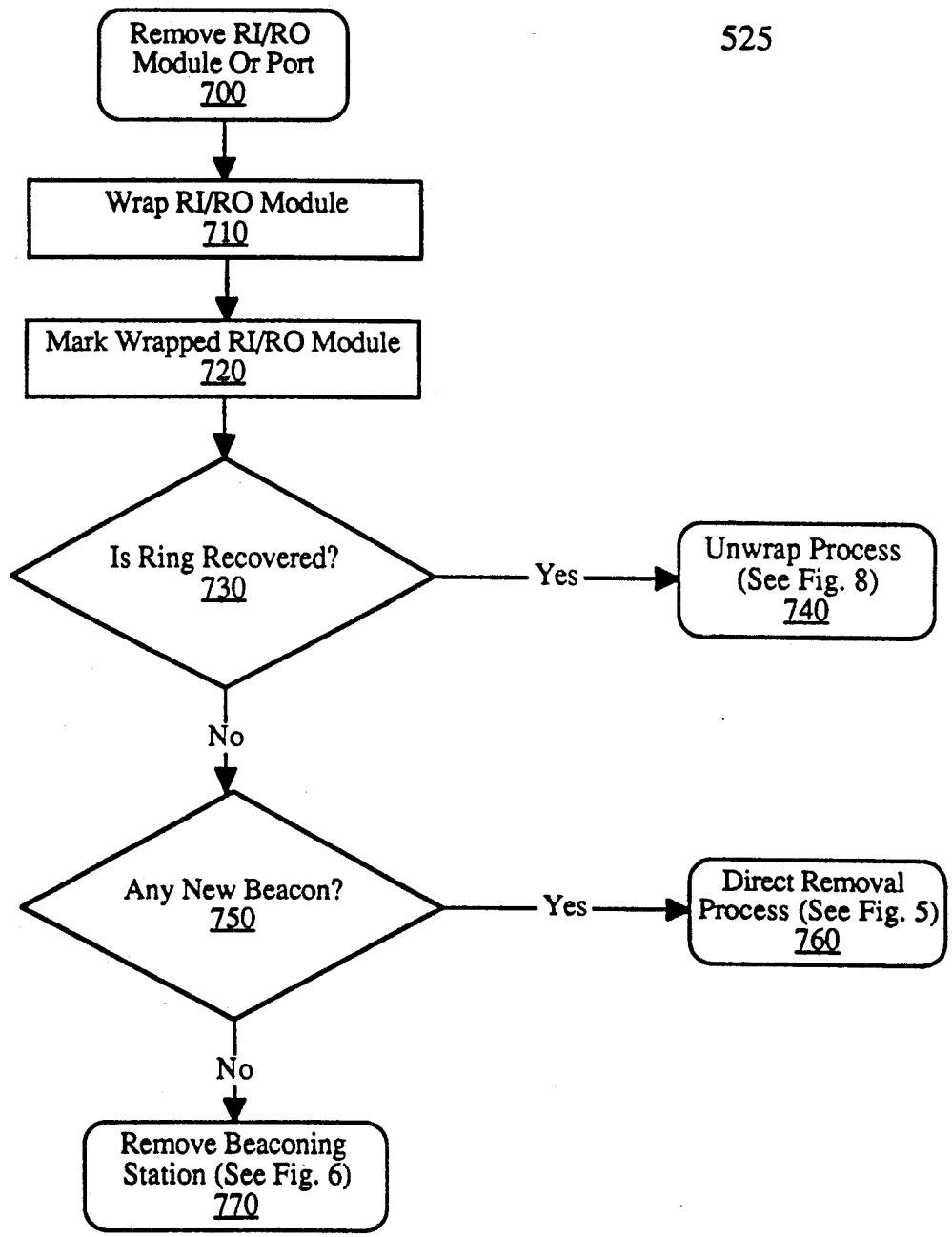
FIG. 7 is a processing task flow diagram of the present invention that removes an RI/RO module (and associated ports) from the current concentrator.

FIG. 7 illustrates more of the processing of the direct removal procedure (block 525) which isolates the RI/RO module of the present concentrator. With reference back to FIG. 5 is it clear that block 525 is the second of the major processing blocks of the direct removal procedure the other block being block 535 as discussed above. Processing begins at block 700 and continues to block 710 where the entire RI/RO module of the present concentrator is isolated. At this point the present concentrator is isolated from the other concentrators that may make up the T/R network; next, block 720 marks the RI/RO module as being wrapped for further processing. The present invention then checks if the ring is recovered at block 730 after removing the RI/RO module from the T/R network of the present concentrator. If the ring recovered then the unwrap and isolate faulty station procedure is executed at block 740. If the T/R network did not recover and isolate faulty station then processing continues to block 750 where the present invention checks if new, additional, beacons are being generated that may have been blocked from a faulty RI/RO module which is now wrapped. (Compare this to block 675 which performs a similar function). If additional beacon dataframes are present then the present invention executes the direct removal process (block 310) for each additional beacon dataframe in a recursive manner to isolate additional faulty stations. If no new beacon dataframes are present at block 750 but the ring has not recovered, then the present beacon dataframe must be generated in response to a faulty station on the present concentrator and not associated with the RI/RO module. In this case, the present invention then executes the remove beaconing station procedure (block 535) at block 770.

Figure 8:
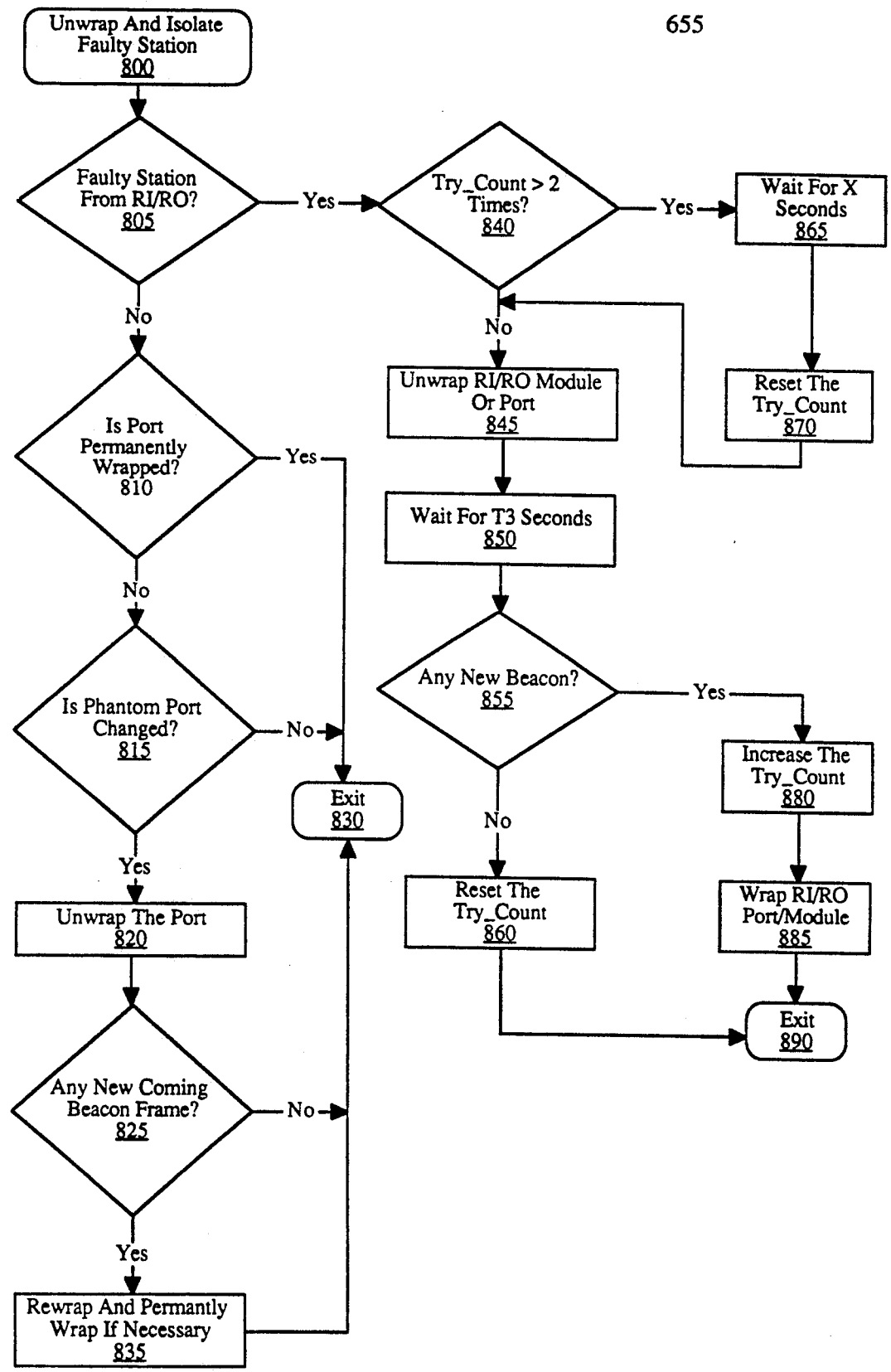
FIG. 8 is a processing task flow diagram of the present invention that performs the unwrapping processing of previously wrapped stations and/or modules and identifies faulty stations.

Refer to FIG. 8 which illustrates the processing of the NMM in the preferred embodiment of the present invention required to unwrap previously wrapped modules and/or ports in order to isolate the faulty stations and integrate stations which were wrapped but not necessarily faulty. This procedure operates in conjunction with the various processing blocks of the direct removal process (block 310) of the present invention. The direct removal process, as disclosed above, operates by continually communicatively removing ports and/or modules from the T/R network until the ring is restored. However, many of the removed ports and modules may not be faulty. Instead, they may have only been interfered with by another faulty port or module and should be unwrapped and re-inserted into the T/R network. For instance, a valid station may merely appear faulty to a down stream station because another faulty station is interfering with the valid station's communication flow. Or, alternatively, the valid station may rely on the faulty station for some interface signal. Once the faulty station is removed, it is important to unwrap the valid station that may have been wrapped by the direct removal process in response to beacon dataframes originating from the down stream station of the valid station.

Therefore, it is the task of the unwrap procedure to selectively, one by one, unwrap each wrapped station or module and determine which one is the faulty station or module. Then, only the faulty station will be wrapped and the others will be once again integrated into the T/R network communication network. The unwrap and isolate faulty station procedure identifies previously wrapped modules and stations by the marking they receive during the wrapping processing. When a port of module is wrapped it is also marked as such and this process individually processes each marked station and module. Processing starts at block 800 and continues to block 805 where the present invention checks if the present faulty station is from the RI/RO port or if the station is within the present concentrator's domain. If the faulty station is within the RI/RO port, then the present invention continues to block 840. At this stage, the present invention is unable to unwrap a single port that does not exist within the present concentrator's domain. Therefore, all the present invention can do is attempt to unwrap the entire RI/RO module at various predetermined intervals to see if an associated alternate concentrator was able to fix the problem and eliminate the beacon dataframes (i.e., to see if the other concentrator wrapped the faulty station).

At block 840, the present invention checks if a try counter is over 2 because the present invention checks the RI/RO module only twice and then waits a predetermined period of time before checking twice again to verify if the RI/RO module is faulty. If the counter is not over two then at block 845 the present invention unwraps the RI/RO module at block 845 integrating it into the T/R network then waits a period of time at block 850 for any new beacon dataframes to generate and become broadcast over the T/R communication traffic. The delay (about 2 seconds) at block 850 is used to handle the unwanted situation when intermittent or transient beaconing states exist in error. At block 855 the present invention checks if any new beacon dataframes are present in response to the integration of the RI/RO module. If beacons are present then at block 880 the present invention increases the try counter and rewraps the RI/RO module at block 885 because whatever faulty station or stations exist on the RI/RO module have not been corrected or removed by the alternate concentrator. At block 890 this pass of the unwrap process is over. Returning to block 855, if no new beacons are present on the T/R network then the faulty station, if any, was corrected or removed by the alternate concentrator. Therefore, the RI/RO module remains unwrapped and the try counter is reset. The processing then exists this round of the unwrap procedure at block 890 and the RI/RO mode is integrated with the present concentrator. If the try counter is over two at block 840 then the present invention has recently tried to unwrap and check the status of the RI/RO module twice and on both occasions found new beacon dataframes. Therefore, the present invention waits for a time period (which is programmable having a default value of about 30 minutes) at block 865 before another set of attempts is made to unwrap and check the status of the RI/RO module. After the delay, they try counter is reset at block 870 and the RI/RO module will unwrap the RI/RO module at block 845 and continue under processing as disclosed above on the next run of the unwrap and isolate process. In this fashion, the present invention will continually poll the RI/RO module by unwrapping it to see if the faulty station has been removed from the T/R network by an alternate concentrator. Eventually, it is desired to unwrap the RI/RO module to fully integrate the present concentrator with the alternate concentrators.

Referring still to FIG. 8, at block 805 if the faulty station is not from the RI/RO module then it must be within the domain of the present concentrator and the present invention will unwrap and check these stations individually. At block 810 the present invention checks to see if the current port is permanently wrapped. If it is permanently wrapped, then it will not become unwrapped and at block 830 the processing exits the procedure. If the current port is not permanently wrapped then the processing continues to block 815 where the phantom port is checked to see if it changed. This port responds to transient ports on the network, i.e., if a computer station was turned on and off in a quick period then a transient signal would be indicated. If the phantom port changed then the processing exits at block 830 without unwrapping the station. If there are three transients (transforms) detected on the phantom port then the port is permanently wrapped. If the phantom port did not change then the current port is unwrapped at block 820 and the present invention checks if any new beacon dataframes are present as a result of the unwrapped port at block 825 when unwrapped the station is temporarily integrated into the T/R network.

Referring to FIG. 8, if new no new beacon dataframes are present at block 825 then this previously wrapped port was not the faulty port, or since being wrapped this port has repaired itself. Then the processing exits the procedure at block 830 and properly leaves the port unwrapped and integrated back into the T/R network. If new beacon dataframes are present on the T/R communication traffic at block 825 then at block 835 the current port is still faulty and it is rewrapped and the present invention verifies if the limit allowed for a station to render the ring beaconing is exceeded. If the station inserts in the ring, creates beaconing within the ring and exceeds this allowed limit then the station will be permanently removed from the T/R network and marked as faulty within the processing of block 835. Then the present invention will exit at block 830. Therefore, the unwrap procedure (block 655) is used in conjunction with the direct removal strategy to unwrap certain modules and ports that may have inadvertently been wrapped during the removal session. Ports that exhibit beaconing on the ring when unwrapped are rewrapped and after a certain amount of rewrapping these ports may become permanently wrapped, marked as faulty and bypassed within the T/R communication network.

Figure 9:
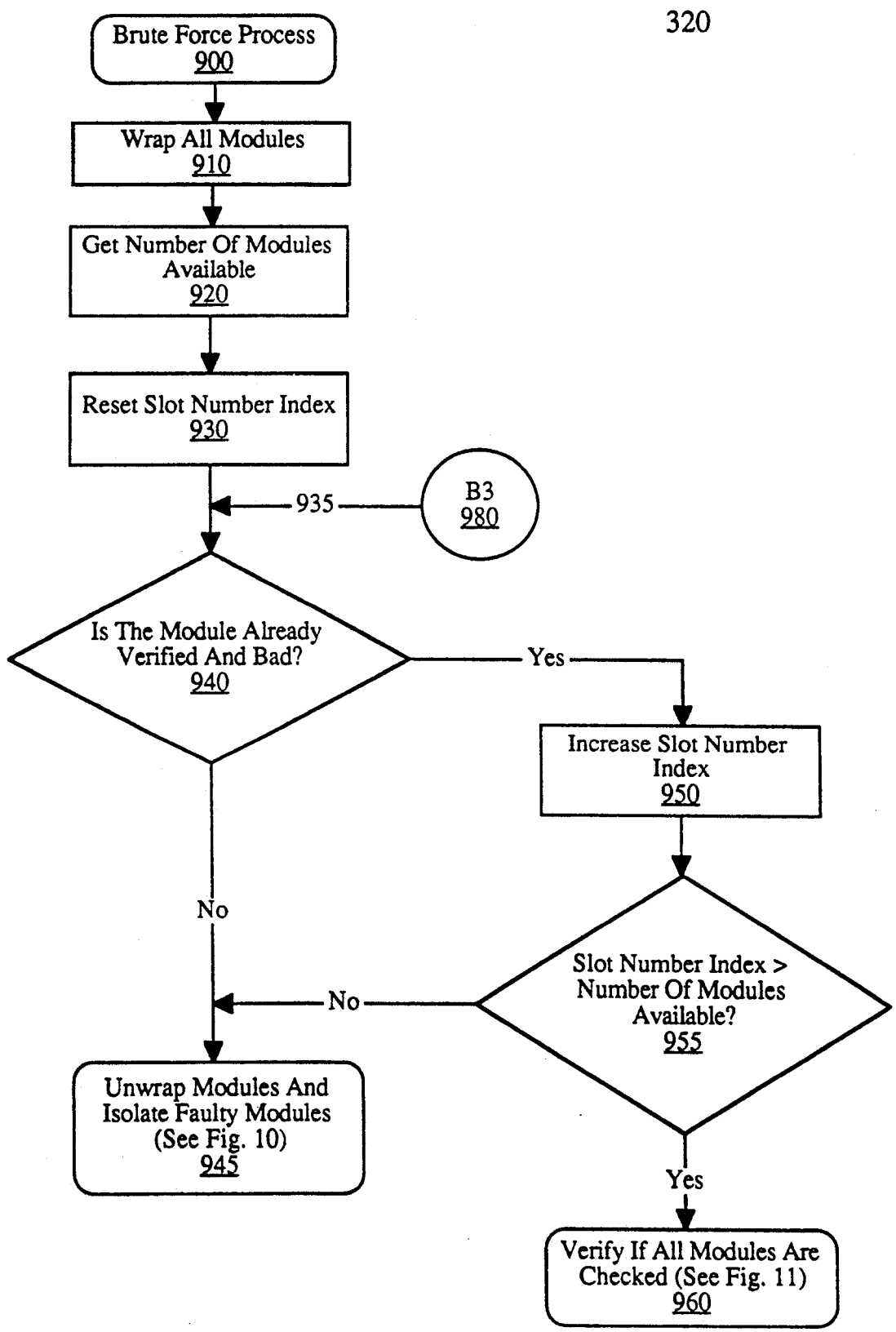
FIG. 9 is a processing task flow diagram of the present invention that performs the brute force processing strategy of identifying and isolating faulty ports and modules which is employed when no port address association data is available.

Brute Force Processing Block 320:

FIG. 9 illustrates the third of the major processing strategies utilized by the NMM in the preferred embodiment of the present invention in order to automatically identify and isolate faulty stations and/or modules in the T/R network. This is called the brute force process (block 320) because no information is available to the present invention in order to help isolate the problem. Therefore, each and every module and port must be checked for faulty communication stations. The brute force process operates when no port address association database has been generated by the T/R network, therefore no UNA values may be obtained from data of the beacon dataframes. There may be no port address association database generated because a faulty station may be present upon network startup. It is appreciated that the brute force process (block 320) may also be entered when there is a port address association database present but nevertheless the direct removal strategy and the unknown removal strategy both failed to remove the faulty station or module from the T/R network.

The processing of the brute force removal strategy begins at block 900 and continues to block 910 where all of the modules of the present concentrator are initially wrapped. The total number of modules located in the slots within the same ring of the present concentrator is then identified at block 920 by the NMM. A counter index indicating the slot number of the current module is reset at block 930. A processing entry point (entry 935) is shown at block 980 which will be further explained in discussions to follow. At block 940 the NMM checks if the current module, represented by the slot number index, is already verified and bad, i.e., faulty. If not then the present invention instructs the NMM to execute block 945 which performs the unwrapping of modules and isolation of faulty modules. This will also be further explained in discussions to follow. If the current module has already been verified and bad as determined at block 940, then at block 950 the slot number index is increased to point to a new module and the slot number index is then compared against the total number of modules within the present concentrator at block 955. If all of the modules have been processed then the flow directs the NMM to block 960 where the processing verifies if all modules are checked (this will be explained further below). If all of the modules have not been verified, then at block 955 the processing is directed to block 945 where the processing unwraps modules and isolates faulty modules. Therefore, at this stage of the brute force process, the present invention is preparing each module of the concentrator for analysis and to wrap and isolate the faulty module by indexing each module one by one. If the module has already been checked then it is skipped.

Figure 10:
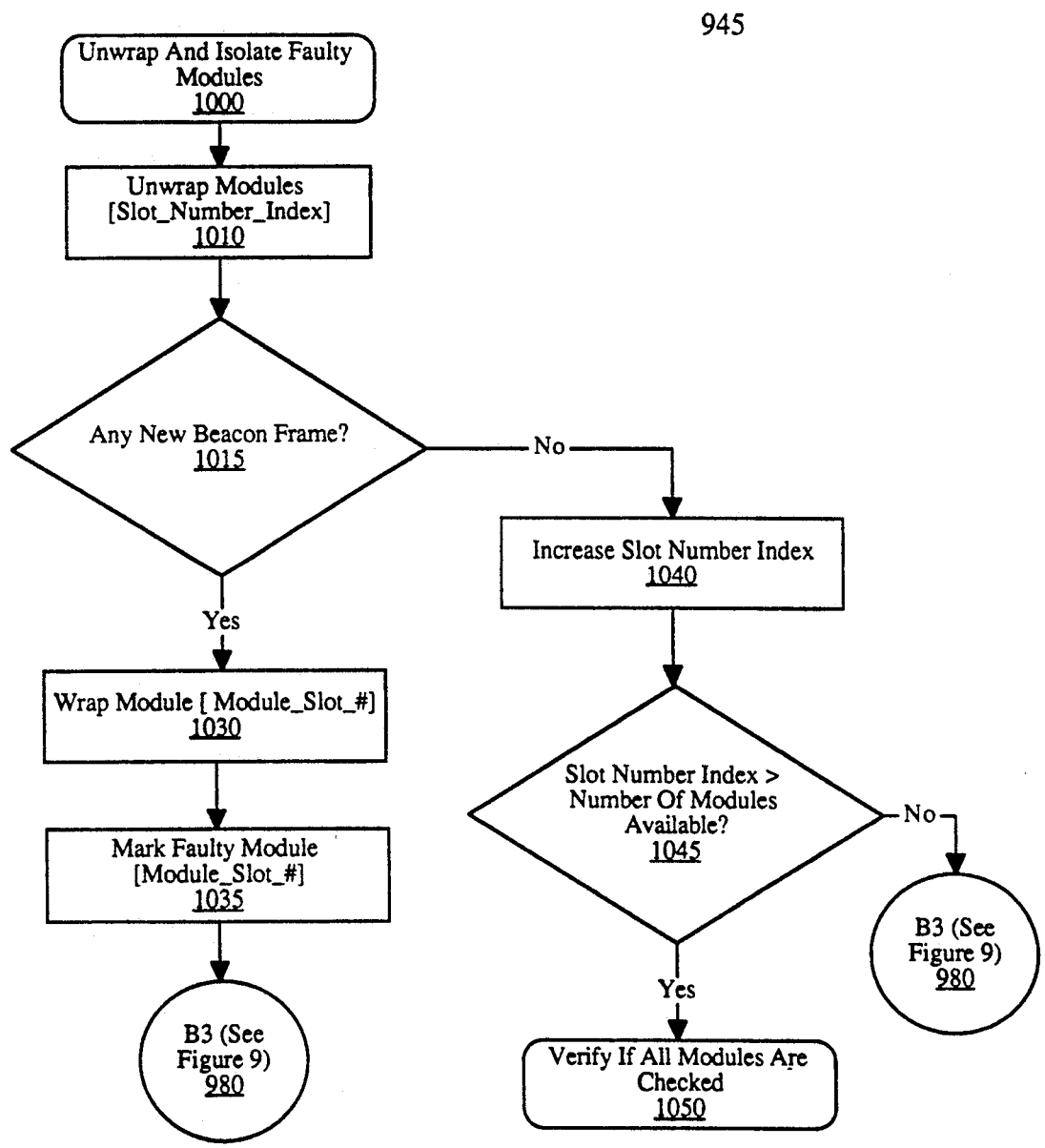
FIG. 10 is a processing task flow diagram of the present invention that performs the unwrapping and isolating of faulty modules for the brute force processing strategy.

Referring to FIG. 10, the process of unwrapping and isolating faulty modules (block 945) of the brute force process of the present invention is disclosed. Processing begins at block 1000 and continues to block 1010 where the current module referenced by the slot number index is unwrapped by the NMM and integrated into the T/R network. Next the present invention monitors the T/R communication traffic for new beacon dataframes at block 1015. If new beacon dataframes are present then the current module must have at least one faulty station associated with the module. Processing goes to block 1030 and that module is wrapped since it is faulty. Next, the present invention marks the module as one that is faulty and the processing then goes to exit block 980 which directs the processing to block 940 (of FIG. 9) to process a new module or check if the last module was processed. If the present invention does not acknowledge a new beacon dataframe on the T/R traffic at block 1015 then the slot number index is incremented at block 1040 and the index is checked to see if the last module was reached at block 1045. It is appreciated that if no new beacon dataframes are present at block 1015 then the module is left unwrapped and integrated. If the last module was reached then block 1050 (also block 960) is executed to verify if all modules are checked. If the last module of the concentrator was not processed then the processing goes to exit block 980 which directs the processing to block 940 (of FIG. 9) to process a new module. By performing this cyclic routine, the brute force processing of the present invention checks each module of the present concentrator and will leave faulty modules wrapped and marked while leaving other modules unwrapped.

Figure 11:
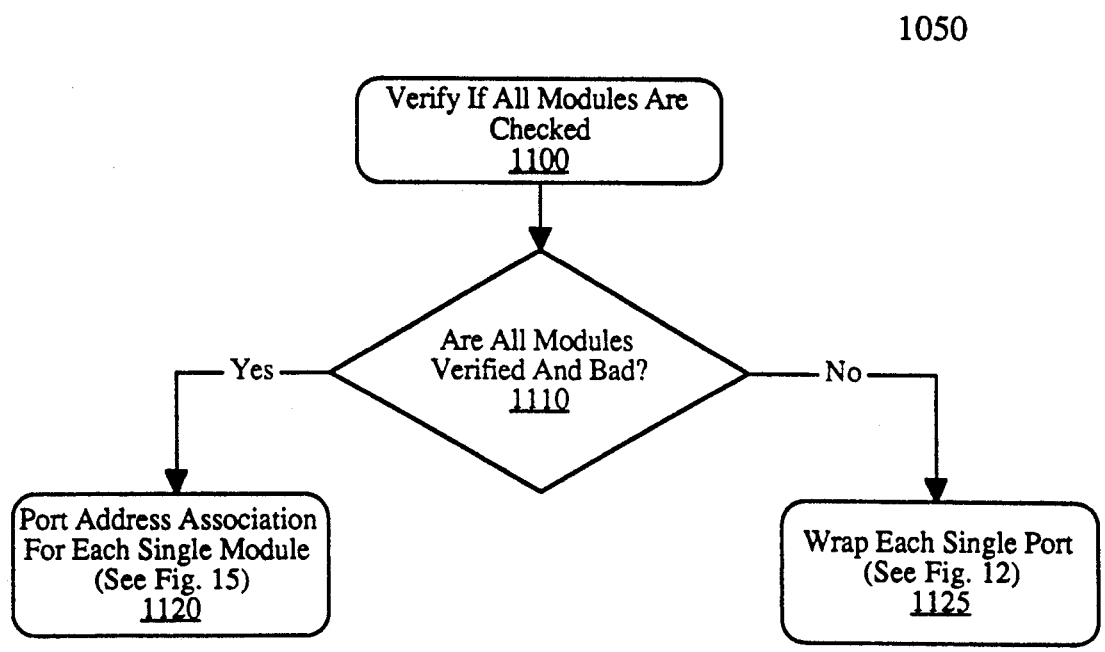
FIG. 11 is a processing task flow diagram of the present invention that performs verification that all modules are checked for the brute force processing strategy.

Referring now to FIG. 11 of the brute force strategy of the present invention, the processing of the NMM to verify if all modules are checked is performed within block 1050. This is the processing directed by block 1050 and equivalent block 960. Processing starts at block 1100 and continues to block 1110 where all modules are checked if they are verified and bad. If all modules are verified and bad then the processing continues to block 1120 where the present invention performs the port address association task for each single module. If all modules are not verified and bad then the processing proceeds to block 1125 where the present invention wraps each single port within the previously identified faulty module or modules. It is appreciated that if all modules are verified and bad then the brute force method has failed and port address association database is constructed by block 1120. After this is constructed the direct removal (block 310) will be executed in a last attempt to correct the T/R communication network fault. The processing of block 1125 will systematically proceed through each station of a faulty module to determine the faulty stations of the T/R network.

Figure 12:
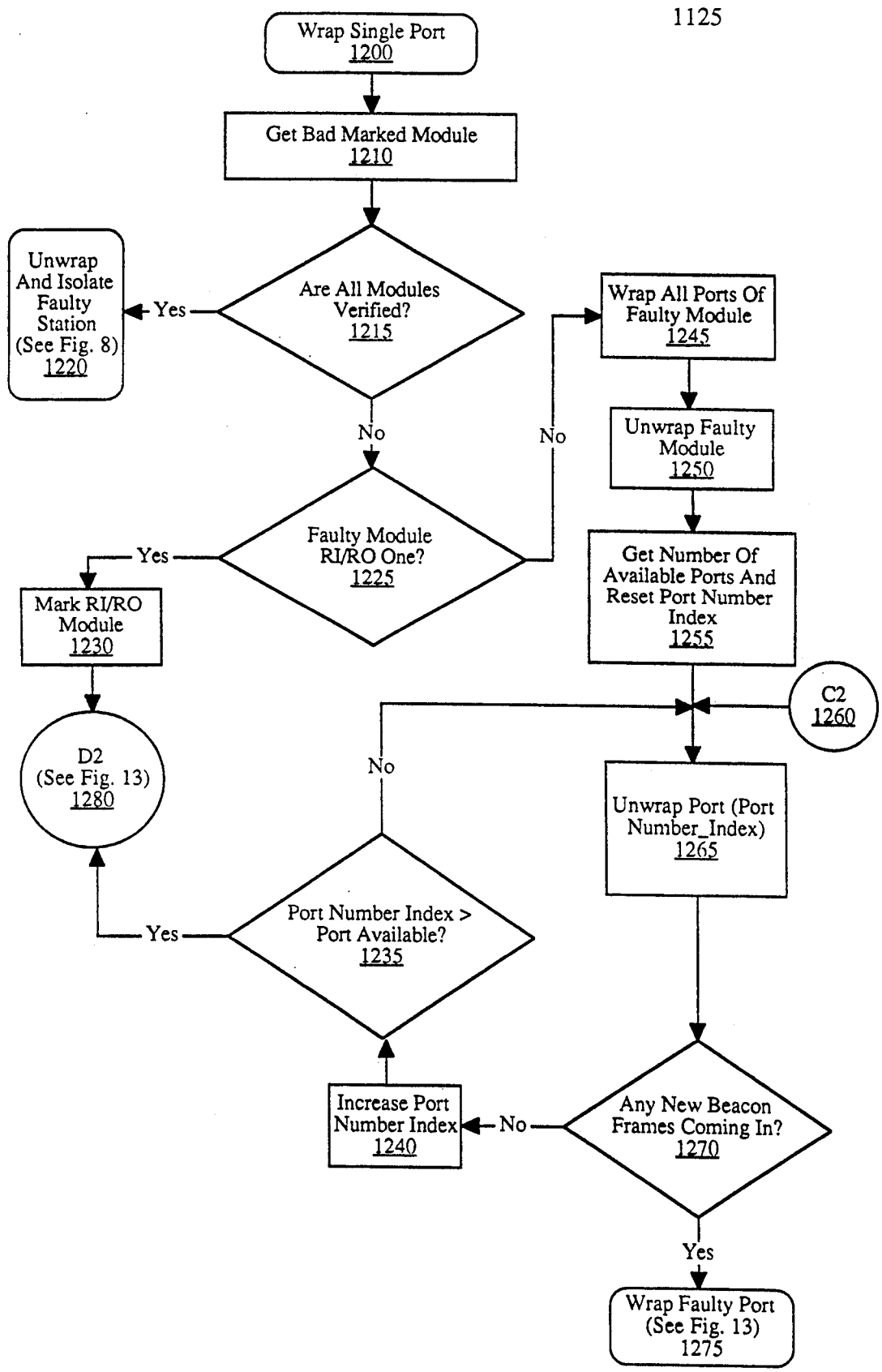
FIG. 12 is a processing task flow diagram of the present invention that wraps a single port during the brute force processing strategy of the faulty module(s).

The flow diagram of FIG. 12 illustrates the procedure of the present invention which checks the ports of each faulty module to determine which ports within the modules are faulty within the brute force strategy for removing faulty stations. The processing is used to wrap and unwrap each single port and determine the faulty one. When the faulty port is located, the NMM will keep it wrapped and marked. The process continues until all the stations and the marked faulty modules are checked. This processing is associated with the brute force processing strategy of the present invention. These blocks fall within the block 1125. Wrapping each single port processing begins at block 1200 and continues to block 1210 where a module is obtained by the NMM that was previously marked as faulty. At block 1215 the present invention checks if all modules have been verified already. If each module of the present concentrator has been verified then the unwrap and isolate faulty stations procedure (block 655) is executed by block 1220 to unwrap modules and stations that may not be faulty. If all of the modules are not verified then processing continues to block 1225 where the present faulty module is checked to see if it is the RI/RO module. If the faulty module is the RI/RO module then a fault exists off of the domain of the present concentrator and the RI/RO module is marked as faulty at block 1230 and processing exits through point 1280 into block 1330 (FIG. 13) to get the next module or check for the end. If the faulty module is not the RI/RO module then the fault exists within a station of a module which is within the domain of the present concentrator.

Referring still to FIG. 12, if the faulty module is not associated with the RI/RO module then processing continues to block 1245 where all the ports of the faulty module are wrapped and the faulty module (as a whole) is unwrapped at block 1250 so as to not mask communications of the individual stations within the faulty module. At block 1255 the present invention obtains the number of ports associated with the faulty module and resets a port number index counter. At block 1265 the port associated with the port number index is individually unwrapped and then at block 1270 the T/R communication traffic is checked if any new beacon dataframes are generated in response to the unwrapping of the current port. If new beacon dataframes are acknowledged on the T/R network then at block 1275 the wrap faulty port process is executed to isolate the present faulty ports of the marked faulty module. If no new beacon dataframes are detected at block 1270 then the present port is not faulty and the port number index counter is increased to select a new port at block 1240 and then block 1235 is entered.

The present port is integrated into the T/R network. At block 1235 the present invention checks if the last port within the faulty module was checked. If not then the present invention processes the next port by executing blocks 1265, 1270, 1275 and 1240 again for each port within the faulty module as described above. At block 1235, when the last port of the module is processed the NMM is directed to exit point 1280 to block 1330 of FIG. 13 to fetch another faulty module if necessary. The above port (station) isolation and identification routines are accomplished by the NMM for each faulty module within the token ring network for each particular concentrator. It is appreciated that entry block 1260 is directed to block 1270 of FIG. 12. The purpose of the processing of FIG. 12 is to identify faulty ports within only those modules that have been previously marked as faulty.

Figure 13:
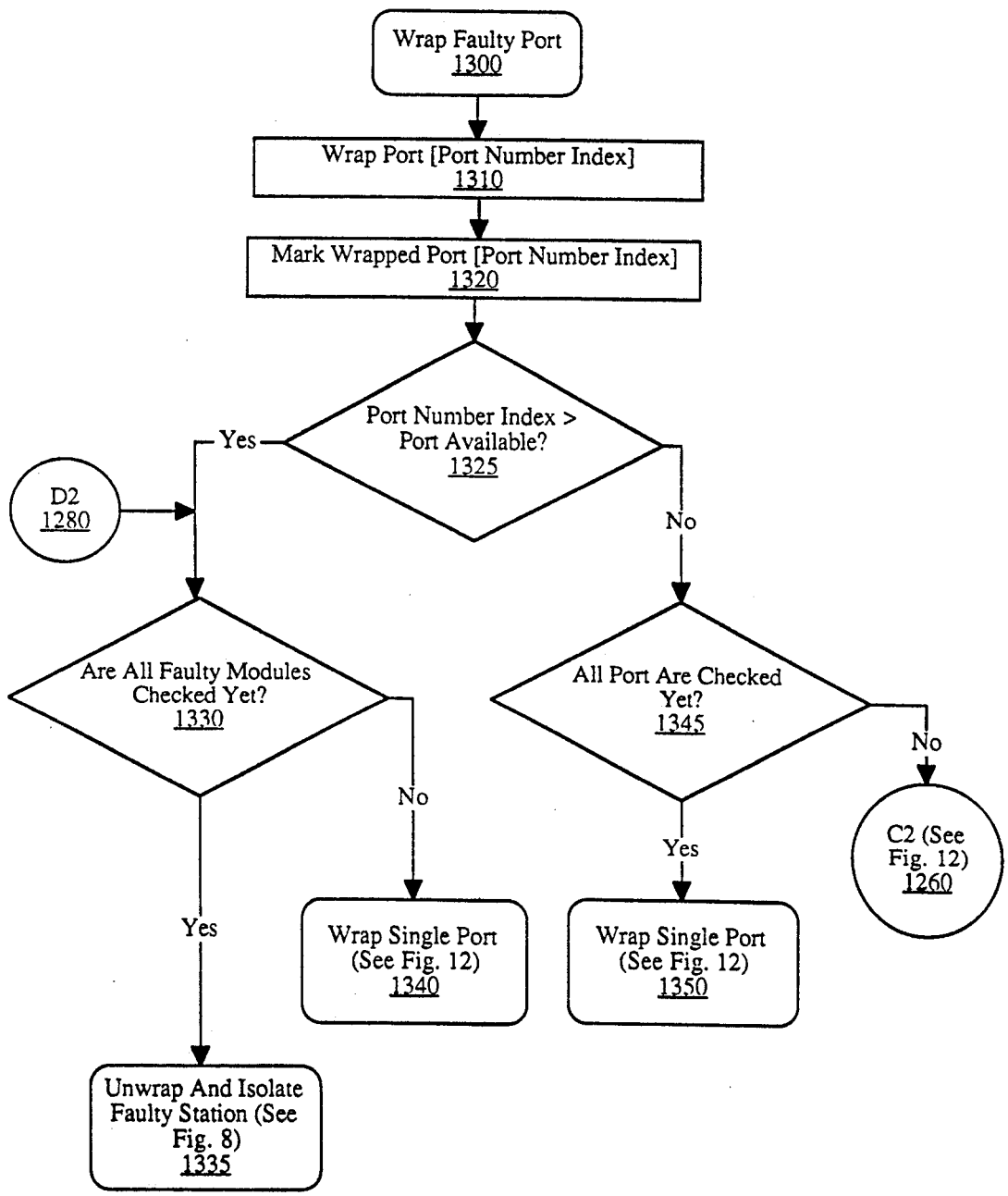
FIG. 13 is a processing task flow diagram of the present invention that wraps an identified faulty port during the brute force processing strategy.

Refer to FIG. 13 of the brute force strategy of the present invention. FIG. 13 illustrates the wrap faulty port processes (all within block 1275) of the present invention. This process actually performs the wrap function of any faulty ports found within the faulty module or modules. Processing begins at block 1300 and continues to block 1310 where the previously identified fault port (referenced by the port number index of FIG. 12) is wrapped or removed from the token ring network. At block 1320 the faulty port, referenced by the port number index is also marked as faulty. At block 1325 the present invention checks if this is the last port of this faulty module. If so then at block 1330 the NMM checks to see that all of the faulty modules have been process, if there are more than one faulty module. If so, then processing continues to block 1335 where the unwrap algorithm of FIG. 8 is executed to isolate the faulty ports and modules of the T/R network and integrate those modules and ports that are not faulty but have been incidentally wrapped by the brute force processing of the present invention. At block 1330 if more faulty modules are present as a result of the brute force processing then the present invention is directed to block 1340 to execute the process for wrapping single port of FIG. 12 in order to process the next faulty module. This process is cyclic until all of the faulty modules have been processed. It is appreciated that entry block 1280 from FIG. 12 enters into block 1330.

Returning to block 1325 of FIG. 13 of the brute force processing, if more ports remain on the current faulty module that have not been processed then the present invention continues to block 1345 where the NMM verifies if all ports have been checked. If not then the next port must be processed and this is accomplished via exit port 1260 which returns the NMM to the processing of FIG. 12 to get another port by increasing the port number index and processing the next port of the faulty module. If all the ports have been checked at block 1345 then the processing is directed to block 1350 which executes the process for wrapping a single port (see FIG. 12) to access the next faulty module, if necessary.

It is appreciated that after the brute force processing of the present invention operates, eventually the unwrap processing of FIG. 8 will process all of the modules and the ports of the T/R network similar to the direct removal processing. Upon completion, the exit points of the unwrap process FIG. 8 will then direct the processing of the present invention back to the main processing block 300.

Therefore, the faulty station identification and isolation processes of the present invention have been described. What follows is discussion regarding the port address association database. The port address association database enables the direct removal process to identify the UNA value given the beacon dataframe and to then identify the upstream neighbor station to the beaconing station. This process is operated continuously in the processing background of the present invention and starts upon some time after startup of the token ring network of the present invention. The process also is executed by direction of block 1120 of FIG. 11. In either case, the NMM proceeds to signal the stations of the T/R network in order to gather information construct and maintain the port address association database. It is appreciated that the port address association is independently processed to construct the port address database by all local ring MAC dataframes. This port address association periodically updates its database whenever it receives an AMP (active monitor present) data frame or SUA report (change of upstream neighbor address) change in a MAC dataframe so that the port address database is able to respond automatically to certain changes in the system components.

Figure 14:
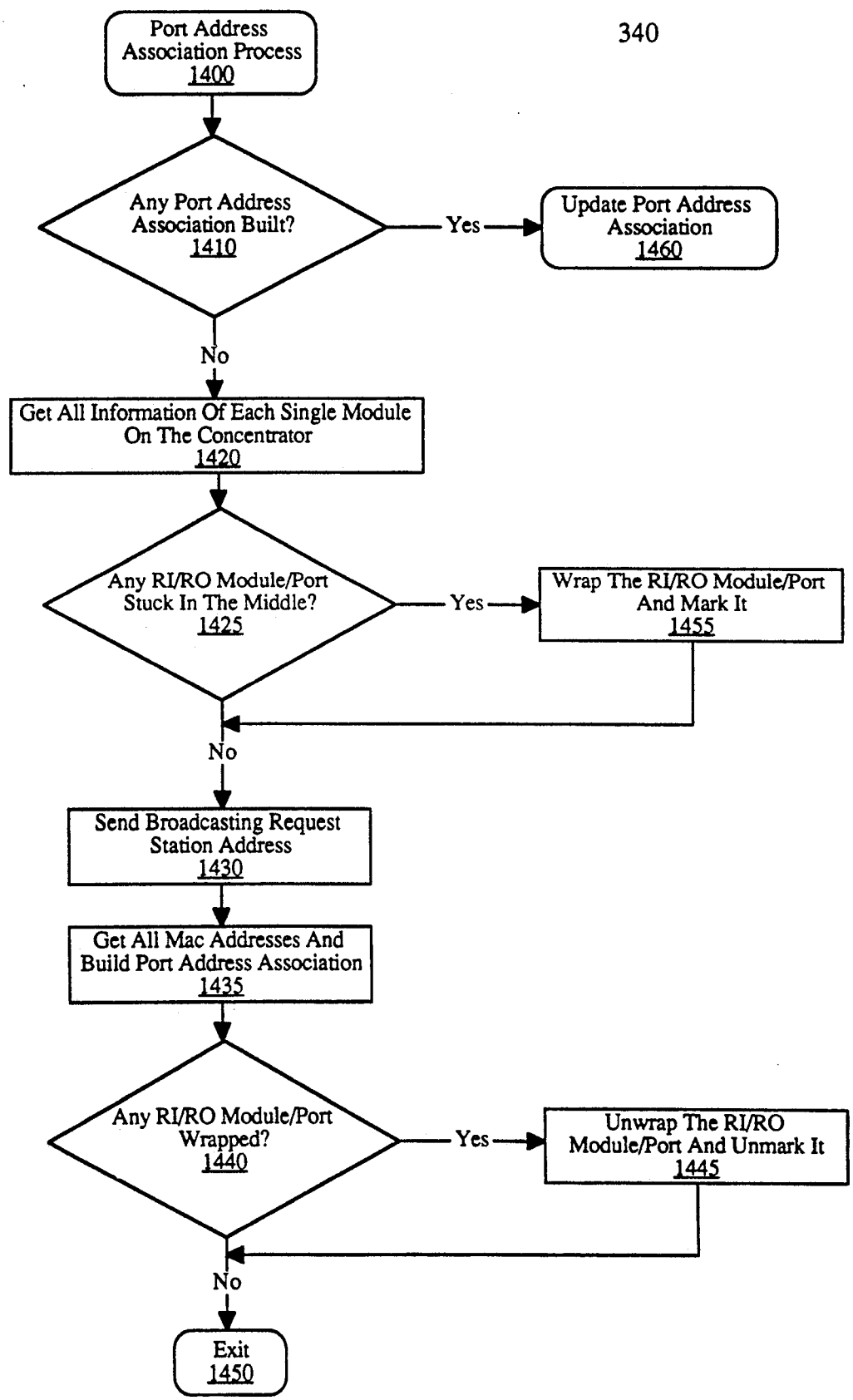
FIG. 14 is a processing task flow diagram of the present invention that creates the port address association database used in the direct removal strategy.
Figure 15:
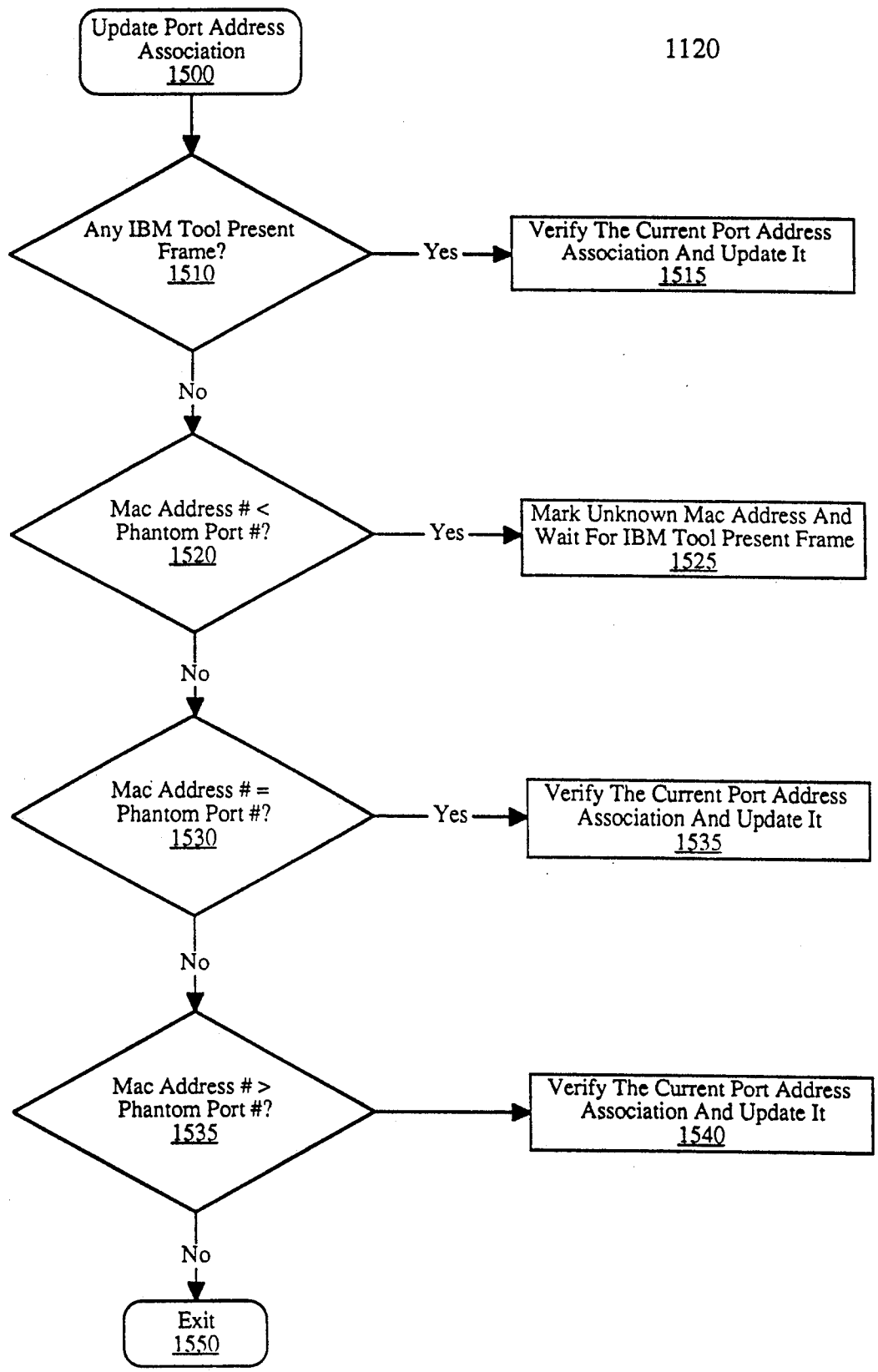
FIG. 15 is a processing task flow diagram of the present invention for updating the port address assocation database.

Port Address Association Database Block 340:

Refer to FIG. 14 which illustrates the flow diagram of the present invention regarding the construction of the port address association database. FIG. 14 and FIG. 15 illustrate the processing of the present invention that occur within the block 340 of the overall flow. A new port address association database can be constructed in about 5 seconds or less. There are three cases that the NMM needs to verify before building a port address association topology. First, the number of MAC addresses is greater than the number of phantom ports. Second, the number of MAC addresses is smaller than the number of phantom pots. Third, the number of MAC addresses is equal to the number of phantom ports. The current port address association may fail, if a concentrator is not configured according to the guideline, i.e., all the RI/RO modules to the left and the NMMs to the right for the 3000/3030 concentrator. If such a condition is detected then the NMM will wrap some modules in order to establish an accurate port address association database then unwrap them when the NMM completes construction of its port address association.

Processing of the NMM of the present invention begins at block 1400 and continues to block 1410 where the present invention checks if there are any port address association database sections constructed already. If so then the port address association database merely needs to be updated and processing of block 1460 is executed. If no port address association database information is constructed then the present invention must construct a new database in block 1420. All of the single modules on the concentrator are polled to obtain adjacency information. This information gathered and placed into a database location. Block 1425 checks to make sure there are no RI/RO modules and/or ports in the middle of other modules of the concentrator. This situation would create errors. If there are such RI/RO modules in the middle then at block 1455 they are wrapped out and marked by the present invention and the processing flows to block 1430. If there are no RI/RO marks in the middle, processing flows to block 1430. At block 1430 the NMM sends broadcasting messages to request station addresses to each station on the modules associated with the concentrators. This information gathered and placed into the database location. At block 1435 the present invention directs the NMM to get all MAC addresses that are received as a result of the NMM requests and to build all of the port address association database entries based on the received data from the associated stations. The port addresser association database is constructed initially at block 1435. At block 1440 and RI/RO module or port that was previously wrapped and marked is identified by the marker and is unwrapped by block 1445. Processing terminates from the task at block 1450.

Referring now to FIG. 15 which illustrates the processing of block 1610 for updating the port address association database. This process operates when the phantom port is signaling a new station or an unknown station on the T/R network is not currently entered into the port address association database. The present processing will update the port address association database to include the phantom port data. This process starts at block 1500. At block 1510 if any IBM tool is present in the frame then at block 1515 the present invention verifies the current port address and updates this information to the port address association database. At block 1520 if the MAC address is less than the phantom port number then at block 1525 the present invention marks the unknown MAC address and waits for the IBM tool present frame. At block 1530 if the MAC address number is equated to the phantom port number then the present invention verifies the current port address association and updates it to the port address association database. At block 1535 if the MAC address is greater than the phantom port number then the present invention verifies the current port address database association and updates this data. The flow exits at block 1550. The port address association database is built depending on the number of ports with phantom and MAC addresses of the stations attached to the concentrator in the same ring. The RI/RO module or port must be in the same ring of the same concentrator.

Common Network Conditions:

The direct removal process of the present invention depends on the availability of port address association database and isolates faulty station(s) indicated from the beacon dataframes containing the beaconing station address and its upstream neighbor station address which can be found from the port address association database. There are three main network configurations that are covered within the direct removal process. Refer to FIG. 2 for reference. First, faulty unknown station (here station 20) may be physically inserted between two good stations (stations 22 and 32) and never participated in ring poll process. (Ring pool is used by the present invention to generate the port address association database.) Station 22 transmits beacon frames and the other stations 24, 30, 34, 32 repeat the beacon frames from station 22. The faulty station 20 is the physical upstream neighbor of the beaconing station 22. Second, faulty unknown station 20 is not physically inserted on the same concentrator with the NMM and the UNA station of the beaconing station 22 is physically from the RI/RO module. All stations have already participated in the ring poll. Station 20 is the faulty station located from the RI/RO module. Third, the UNA station is actually the physical upstream station of a beaconing station. In this case, the faulty station can be the UNA station or the beaconing station itself. In this case all the stations participated in ring poll. Station 20 is the faulty station located on the local concentrator ring.

The preferred embodiment of the present invention, a system for automatically identifying and isolating in a timely manner problem stations from a token ring communication network, is thus described. While the present invention has been described in one particular embodiment, it should be appreciated that the present invention should not be construed as limited by such embodiment, but rather construed according to the below claims.

What is claimed is:

1. In a token ring network having a plurality of stations coupled in a ring topology, said stations generating and repeating beacon dataframes to indicate a communication fault within said token ring network, an apparatus for isolating faulty stations comprising:
   first isolating means for isolating from said network newly inserted stations of said plurality of stations in response to said beacon dataframes, said newly inserted stations being those stations that were recently inserted into said network;
   second isolating means for directly isolating from said network particular stations of said plurality of stations identified by a port address association database indexed by said beacon dataframes, said second isolating means operable if said first isolating means fails to remove said beacon dataframes from said token ring network; and
   third isolating means for sequentially isolating from said network each station of said plurality of stations, said third isolating means operable if said first isolating means and said second isolating means fail to remove said beacon dataframes from said token ring network.

2. An apparatus for isolating faulty stations as described in claim 1 further comprising means for integrating into said token ring network particular stations that are not faulty but that were previously isolated by said second isolating means and/or said third isolating means, said means for integrating also for indicating faulty stations by leaving isolated any faulty stations which were isolated by said second isolating means and/or said third isolating means.

3. An apparatus for isolating faulty stations as described in claim 1 wherein said second isolating means is operable if said port address association database is available and wherein said third isolating means is operable with or without availability of said port address association database.

4. An apparatus for isolating faulty stations as described in claim 1 wherein each of said particular stations isolated by said second isolating means is an upstream neighbor station of a beaconing station and wherein each of said particular stations isolated by said second isolating means is said beaconing station if said upstream neighbor station of said beaconing station was previously isolated.

5. An apparatus for isolating faulty stations as described in claim 4 wherein said beacon dataframe contains an address of said beaconing station and wherein said port address association database provides an upstream neighbor address to identify said upstream neighbor station in response to said address of said beaconing station.

6. An apparatus for isolating faulty stations as described in claim 5 further comprising:
   a plurality of modules each having associated stations and wherein one of said plurality of modules is an RI/RO module;
   concentrator means for providing a coupling hub for said plurality of modules, said plurality of modules coupled to said concentrator means; and
   wherein said RI/RO module is for coupling said concentrator means to another concentrator means.

7. An apparatus for isolating faulty stations as described in claim 6 wherein said second isolating means comprises:
   means for isolating said RI/RO module of said concentrator means if said upstream neighbor address references an upstream neighbor station which is associated with said RI/RO module; and
   means for individually isolating said upstream neighbor station referenced by said upstream neighbor address if said upstream neighbor station is not associated with said RI/RO module.

8. An apparatus for isolating faulty stations as described in claim 1 wherein stations of said plurality of stations are associated with modules of a plurality of modules and wherein said third isolating means comprises:
   means for isolating all of said plurality of modules of said token ring network;
   means for integrating each isolated module if integration of said each isolated module does not cause generation of beacon dataframes, said means for integrating also for marking isolated modules which are not integrated to generate marked modules; and
   means for integrating each station associated with each of said marked modules if integration of said each station associated with each of said marked modules does not cause generation of beacon dataframes.

9. An apparatus for isolating faulty stations as described in claim 1 further comprising: a plurality of modules; and wherein stations of said plurality of stations are associated with said plurality of modules and concentrator means for providing a coupling hub for said plurality of modules, and wherein said first isolating means comprises:
   means for isolating newly inserted modules of said plurality of modules, said newly inserted modules coupled to said concentrators, said newly inserted modules being those modules that were recently inserted into said network; and
   means for isolating newly inserted stations, said newly inserted stations associated with particular modules of said plurality of modules.

10. An apparatus for isolating faulty stations as described in claim 1 further comprising a plurality of concentrator means and wherein said first isolating means, said second isolating means and said third isolating means are operable within a network management module of each concentrator means of said token ring communication network.

11. In a token ring communication network having a plurality of communicating stations generating communication traffic, each of said plurality of communicating stations generating beacon dataframes within said communication traffic in response to communication faults between said plurality of communicating stations, an apparatus for identifying and communicatively isolating faulty stations, said apparatus comprising:

first isolating means for isolating from said network newly inserted stations of said plurality of communicating stations in response to said beacon dataframes to remove said beacon dataframes from said communication traffic, said newly inserted stations being those stations that were recently inserted into said network;

second isolating means for directly isolating from said network particular stations of said plurality of communicating stations identified by a port address association database referenced by said beacon dataframes to remove said beacon dataframes from said communication traffic, said second isolating means operable if said first isolating means fails to isolate all faulty stations; and third isolating means for procedurally isolating from said network each station of said plurality of communicating stations to remove said beacon dataframes from said communication traffic, said third isolating means operable if said first isolating means and said second isolating means fail to isolate said all faulty stations.

12. An apparatus for identifying and communicatively isolating faulty stations as described in claim 11 further comprising means for integrating particular stations that are not faulty but that were previously isolated by said second isolating means and/or said third isolating means, said means for integrating particular stations also for indicating faulty stations by leaving isolated any faulty stations which were isolated by said second isolating means and/or said third isolating means.

13. An apparatus for identifying and communicatively isolating faulty stations as described in claim 11 wherein said second isolating means is operable if said port address association database is available and wherein said third isolating means is operable with or without availability of said port address association database.

14. An apparatus for identifying and communicatively isolating faulty stations as described in claim 11 wherein each of said particular stations isolated by said second isolating means is an upstream neighbor station of a beaconing station and wherein each of said particular stations isolated by said second isolating means is said beaconing station if said upstream neighbor station of said beaconing station has been previously isolated.

15. An apparatus for identifying and communicatively isolating faulty stations as described in claim 14 wherein each of said beacon dataframes contains an address of said beaconing station and wherein said port address association database provides an upstream neighbor address in response to said address of said beaconing station, said upstream neighbor address to identify said upstream neighbor station.

16. An apparatus for identifying and communicatively isolating faulty stations as described in claim 15 further comprising:

a plurality of modules each having associated communicating stations of said plurality of communicating stations and wherein one of said plurality of modules is an RI/RO module;

concentrator means for providing a coupling hub for said plurality of modules, said plurality of modules coupled to said concentrator means; and wherein said RI/RO module is for coupling said concentrator means to another concentrator means.

17. An apparatus for identifying and communicatively isolating faulty stations as described in claim 16 wherein said second isolating means comprises:

means for isolating said RI/RO module of said concentrator means if said upstream neighbor address references an upstream neighbor station which is associated with said RI/RO module; and means for isolating said upstream neighbor station identified by said upstream neighbor address if said upstream neighbor station is not associated with said RI/RO module.

18. An apparatus for identifying and communicatively isolating faulty stations as described in claim 11 wherein said plurality of communicating stations are associated with a plurality of modules and wherein said third isolating means comprises:

means for isolating all of said plurality of modules and associated communicating stations of said token ring communication network;

means for integrating each isolated module if integration of said each isolated module does not cause generation of beacon dataframes within said communication traffic, said means for integrating also for marking modules which are not integrated to form marked modules; and means for integrating each station associated with each of said marked modules if integration of said each station associated with each of said marked modules does not cause generation of beacon dataframes within said communication traffic.

19. An apparatus for identifying and communicatively isolating faulty stations as described in claim 11 further comprising a plurality of modules, and concentrator means for providing a coupling hub for said plurality of modules, said plurality of communicating stations associated with said plurality of modules and wherein said first isolating means comprises:

means for isolating newly inserted modules of said plurality of modules, said newly inserted modules coupled to said concentrators, said newly inserted modules being those modules that were recently inserted into said network; and means for isolating newly inserted communicating stations, said newly inserted communicating stations associated with particular modules of said plurality of modules.

20. An apparatus for identifying and communicatively isolating faulty stations as described in claim 11 further comprising a plurality of concentrator means and wherein said first isolating means, said second isolating means and said third isolating means are operable within a network management module of each concentrator means of said token ring communication network.

21. A token ring network for automatically identifying and isolating faulty communications, said token ring network comprising:

a plurality of concentrators for providing coupling hubs;

a plurality of modules for coupling to said plurality of concentrators;

a plurality of stations for coupling to said plurality modules;

means for generating beacon dataframes from said plurality of stations in response to communication faults within said token ring network, each of said beacon dataframes containing a beacon station address;

a port address association database for providing an output upstream neighbor address corresponding to an input beacon station address;

first isolating means for isolating from said network newly inserted stations in response to said beacon dataframes and for isolating newly inserted modules in response to said beacon dataframes, said newly inserted stations and modules being those stations and modules that were recently inserted into said network;

second isolating means for directly isolating from said network particular stations of said plurality of stations based on said port address association database indexed by said beacon dataframes, said second isolating means operable if said first isolating means fails to stop generation of said beacon dataframes; and third isolating means for sequentially isolating from said network each station of said plurality of stations until said beacon dataframes are no longer generated within said token ring network, said third isolating means operable if said first isolating means and said second isolating means fail to stop generation of said beacon dataframes over said token ring network.

22. A token ring network for automatically identifying and isolating faulty communications as described in claim 21 further comprising means for integrating particular stations that are not faulty but that were previously isolated by said second isolating means and/or said third isolating means, said means for integrating particular stations also for indicating faulty stations by leaving isolated any faulty stations which were previously isolated by said second isolating means and/or said third isolating means.

23. A token ring network for automatically identifying and isolating faulty communications as described in claim 22 wherein said means for integrating particular stations comprises:

means for integrating each previously isolated station if said integrating results in no beacon dataframes over said token ring network; and means for marking as faulty and leaving isolated each previously isolated station if said integrating results in beacon dataframes over said token ring network.

24. A token ring network for automatically identifying and isolating faulty communications as described in claim 21 wherein said second isolating means is operable if said port address association database is available and wherein said third isolating means is operable with or without availability of said port address association database.

25. A token ring network for automatically identifying and isolating faulty communications as described in claim 21 wherein each of said particular stations isolated by said second isolating means is an upstream neighbor station of a beaconing station and wherein each of said particular stations isolated by said second isolating means is said beaconing station if said upstream neighbor station of said beaconing station was previously isolated.

26. A token ring network for automatically identifying and isolating faulty communications as described in claim 25 further comprising an RI/RO module for coupling concentrators together and wherein said second isolating means comprises:

means for isolating said RI/RO module if said upstream neighbor address references said upstream neighbor station which is associated with said RI/RO module; and means for isolating said upstream neighbor station referred by said upstream neighbor address if said upstream neighbor station is not associated with said RI/RO module.

27. A token ring network for automatically identifying and isolating faulty communications as described in claim 21 wherein said third isolating means comprises:

means for isolating all of said plurality of modules of said token ring network;

means for sequentially integrating each isolated module if integration of said each module does not cause generation of beacon dataframes within said token ring network, said means for sequentially integrating also for marking modules which are not integrated to form marked modules; and means for sequentially integrating each station associated with each of said marked modules if integration of said each station associated with each of said marked modules does not cause generation of beacon dataframes within said token ring network.

28. A token ring network for automatically identifying and isolating faulty communications as described in claim 21 wherein said first isolating means comprises:

means for isolating newly inserted modules of said plurality of modules, said newly inserted modules coupled to said plurality of concentrators; and means for isolating newly inserted stations of said plurality of stations, said newly inserted stations associated with particular modules of said plurality of modules.

29. In a token ring communication network having a plurality of stations, each of said plurality of stations generating beacon dataframes in response to communication faults within communication traffic between said plurality of stations, a method for identifying and communicatively isolating faulty stations of said plurality of stations, said method comprising the steps of:

a first step of isolating from said network newly inserted stations into said token ring communication network in response to said beacon dataframes to remove said beacon dataframes from said communication traffic, said newly inserted stations being those stations that were recently inserted into said network;

a second step of directly isolating from said network particular stations of said plurality of stations based on a port address association database indexed by said beacon dataframes to remove said beacon dataframes from said communication traffic, said second step operable if said first step fails to remove said beacon dataframes from said communication traffic; and a third step of sequentially isolating from said network each station of said plurality of stations to remove said beacon dataframes from said communication traffic, said third step operable if said first step and said second step fail to remove said beacon dataframes from said communication traffic.

30. A method for identifying and communicatively isolating faulty stations as described in claim 29 further comprising the step of:
    integrating particular stations that are not faulty but that were isolated by said second isolating means and/or said third isolating means; and
    indicating faulty stations by leaving isolated any faulty stations which were isolated by said second step and/or said third step.

31. A method for identifying and communicatively isolating faulty stations as described in claim 29 wherein said second step is operable if said port address association database is available and wherein said third step is operable with or without availability said port address association database.

32. A method for identifying and communicatively isolating faulty stations as described in claim 29 wherein each of said particular stations isolated by said second step is isolated by the steps of:
    identifying an upstream neighbor station of a beaconing station by obtaining an upstream neighbor address as an output from said port address association database in response to an input beacon station address from said beacon dataframe associated with said beaconing station;
    isolating said upstream neighbor station of said beaconing station; and
    isolating said beaconing station if said upstream neighbor station of said beaconing station had been previously isolated.

33. A method for identifying and communicatively isolating faulty stations as described in claim 32 further comprising the steps of:
    providing a plurality of modules each having associated stations of said plurality of stations and wherein one of said plurality of modules is an RI/RO module;
    providing concentrator means for providing a coupling hub for said plurality of modules, said plurality of modules coupled to said concentrator means; and
    wherein said RI/RO module is for coupling said concentrator means to another concentrator means.

34. A method for identifying and communicatively isolating faulty stations as described in claim 33 wherein said second step comprises the steps of:
    isolating said RI/RO module of said concentrator means if said upstream neighbor address references an upstream neighbor station which is associated with said RI/RO module; and
    isolating said upstream neighbor station identified by said upstream neighbor address if said upstream neighbor station is not associated with said RI/RO module.

35. A method for identifying and communicatively isolating faulty stations as described in claim 29 wherein said plurality of stations are associated with a plurality of modules and wherein said third step comprises the steps of:
    isolating all of said plurality of modules of said token ring communication network;
    integrating each isolated module if said integrating of said each module does not cause generation of beacon dataframes within said communication traffic;
    marking modules of said each isolated module not integrated by said step of integrating each isolated module to form marked modules; and
    integrating each station associated with each of said marked modules if integration of said each station associated with each of said marked modules does not cause generation of beacon dataframes within said communication traffic.

36. A method for identifying and communicatively isolating faulty stations as described in claim 29 wherein said plurality of stations are associated with a plurality of modules and wherein said first step comprises the steps of:
    providing concentrator means for providing a coupling hub for said plurality of modules;
    isolating newly inserted modules of said plurality of modules, said newly inserted modules coupled to said concentrators and said newly inserted modules being those modules that were recently inserted into said network; and
    isolating newly inserted communication stations, said newly inserted communicating stations associated with particular modules of said plurality of modules.

37. A method for identifying and communicatively isolating faulty stations as described in claim 29 further comprising the step of providing a plurality of concentrator means and wherein said first step, said second step and said third step operate separately and simultaneously within different concentrator means of said plurality of concentrator means.

* * * * *